United States Patent
Zhang et al.

(10) Patent No.: US 12,352,929 B2
(45) Date of Patent: Jul. 8, 2025

(54) OPTICAL IMAGING LENS

(71) Applicant: ZHEJIANG SUNNY OPTICS CO., LTD., Yuyao (CN)

(72) Inventors: Yi Zhang, Yuyao (CN); Fujian Dai, Yuyao (CN); Liefeng Zhao, Yuyao (CN)

(73) Assignee: ZHEJIANG SUNNY OPTICS CO., LTD., Yuyao (CN)

( * ) Notice: Subject to any disclaimer, the term of this patent is extended or adjusted under 35 U.S.C. 154(b) by 693 days.

(21) Appl. No.: 17/318,491

(22) Filed: May 12, 2021

(65) Prior Publication Data

US 2021/0364756 A1    Nov. 25, 2021

(30) Foreign Application Priority Data

May 21, 2020 (CN) .......................... 202010435060.1

(51) Int. Cl.
*G02B 13/00* (2006.01)
*G02B 9/64* (2006.01)

(52) U.S. Cl.
CPC .......... *G02B 13/0045* (2013.01); *G02B 9/64* (2013.01)

(58) Field of Classification Search
CPC ........ G02B 3/02; G02B 9/64; G02B 13/0045; G02B 13/04; G02B 13/18; G02B 15/146; G02B 15/1461; G02B 27/0025; H04N 5/222
USPC ................ 359/656, 681, 708, 749, 750, 754
See application file for complete search history.

(56) References Cited

U.S. PATENT DOCUMENTS 11,467,381 B2 * 10/2022 Yan ..................... G02B 13/18
2019/0107690 A1    4/2019 Wenren

FOREIGN PATENT DOCUMENTS

| CN | 110554485 A | 12/2019 | |
|----|---|---|---|
| CN | 11090802 A | 3/2020 | |
| CN | 110927928 A | 3/2020 | |
| CN | 110967814 A | 4/2020 | |
| CN | 111061036 A * | 4/2020 | ......... G02B 13/0015 |
| CN | 111077650 A | 4/2020 | |
| CN | 1110255323 A | 4/2020 | |

(Continued)

OTHER PUBLICATIONS

English translation of Ge (CN 111061036 A), from Google Patents.*
Chinese Evaluation Report dated May 24, 2023.

*Primary Examiner* — Stephone B Allen
*Assistant Examiner* — Daniel Jeffery Jordan
(74) *Attorney, Agent, or Firm* — Birch, Stewart, Kolasch & Birch, LLP

(57) ABSTRACT

An optical imaging lens includes in order from an object side to an image side along an optical axis a first lens, a second lens, a third lens, a fourth lens, a fifth lens, a sixth lens, a seventh lens and an eighth lens. The first and seventh lens have a positive refractive power. The maximum semi-field of view Semi-FOV and a total effective focal length f of the optical imaging lens satisfy f×tan(Semi-FOV)>4.5 mm. A radius of curvature R13 of an object side surface of the seventh lens, a radius of curvature R15 of an object side surface of the eighth lens, and a separation distance T78 between the seventh lens and the eighth lens on the optical axis satisfy −7.0<(R13+R15)/T78<−3.0. A combined focal length f12 of the first and second lens and an effective focal length f3 of the third lens satisfy 2.0<f3/f12<6.0.

18 Claims, 12 Drawing Sheets

(56) References Cited

FOREIGN PATENT DOCUMENTS

| CN | 111142223 A | * | 5/2020 | ......... G02B 13/0015 |
| CN | 212207825 U | | 12/2020 | |

* cited by examiner

Longitudinal Aberration Curve

Astigmatism Curve

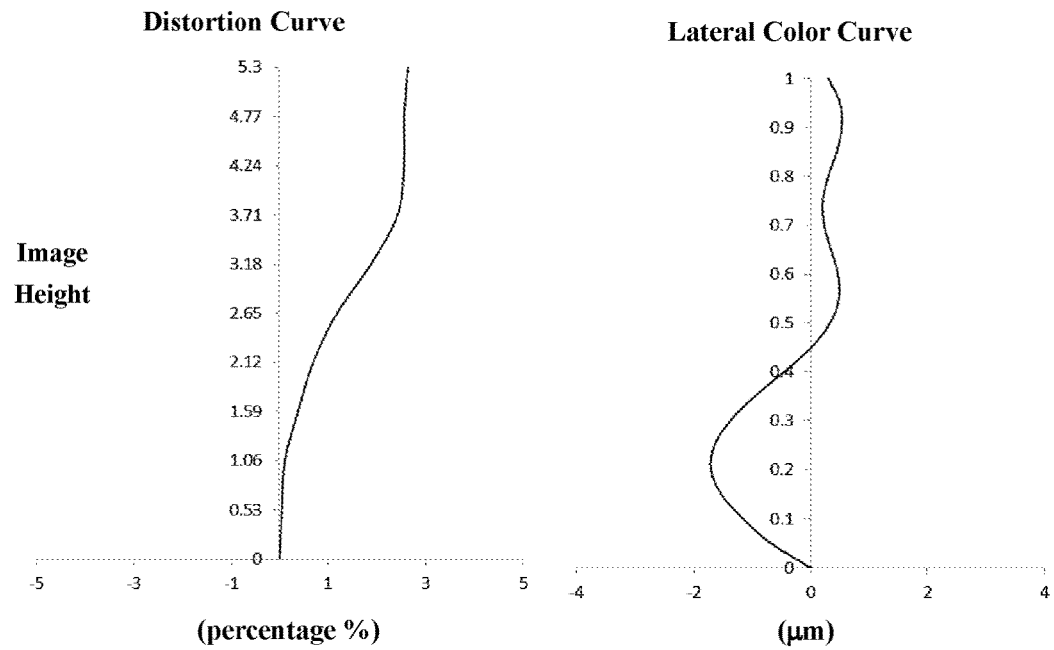
Fig. 2C
Fig. 2D
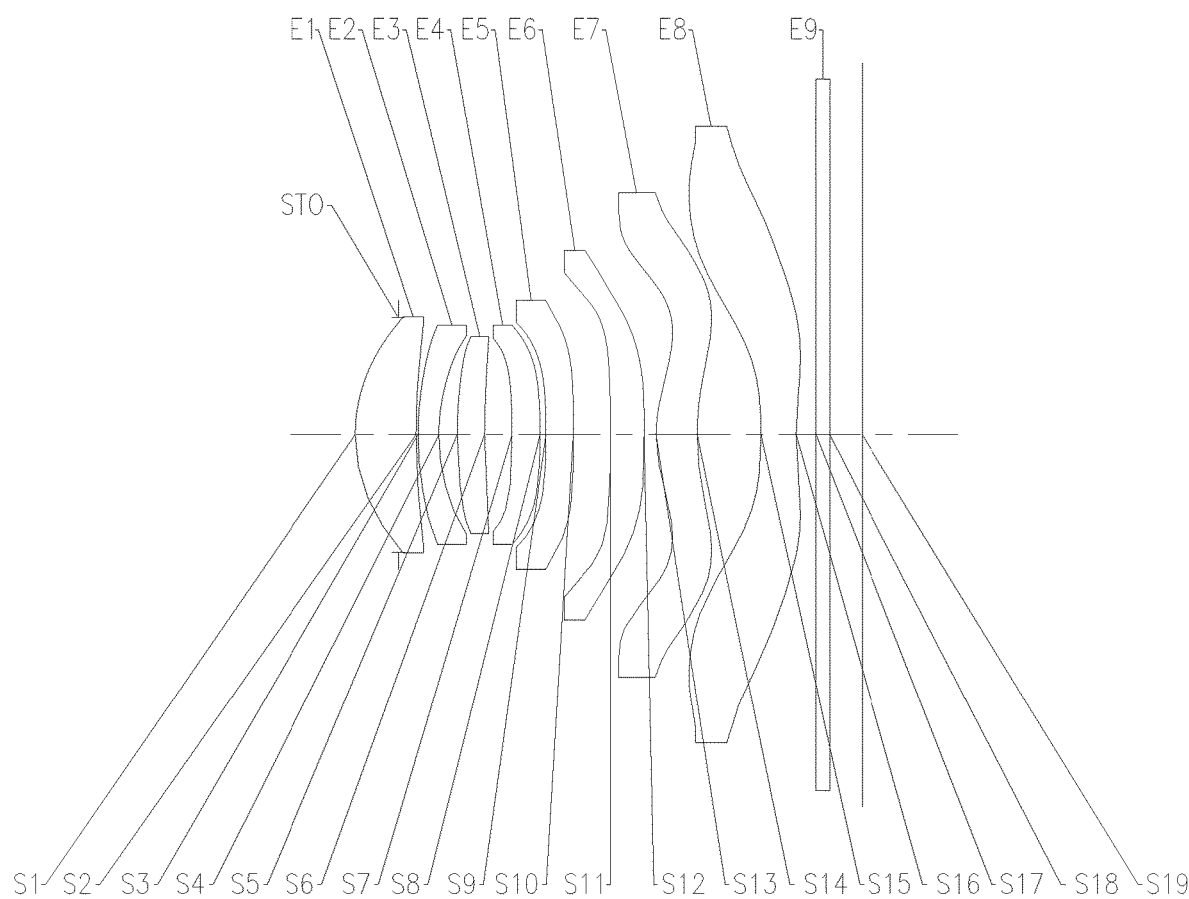
Fig. 3

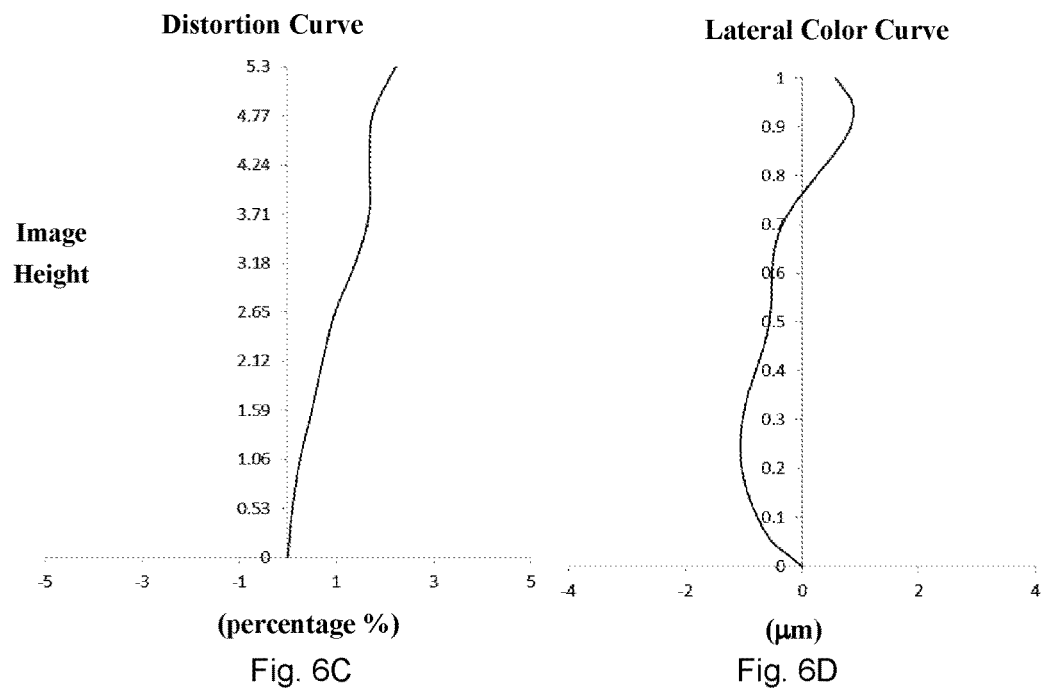
Fig. 6C
Fig. 6D
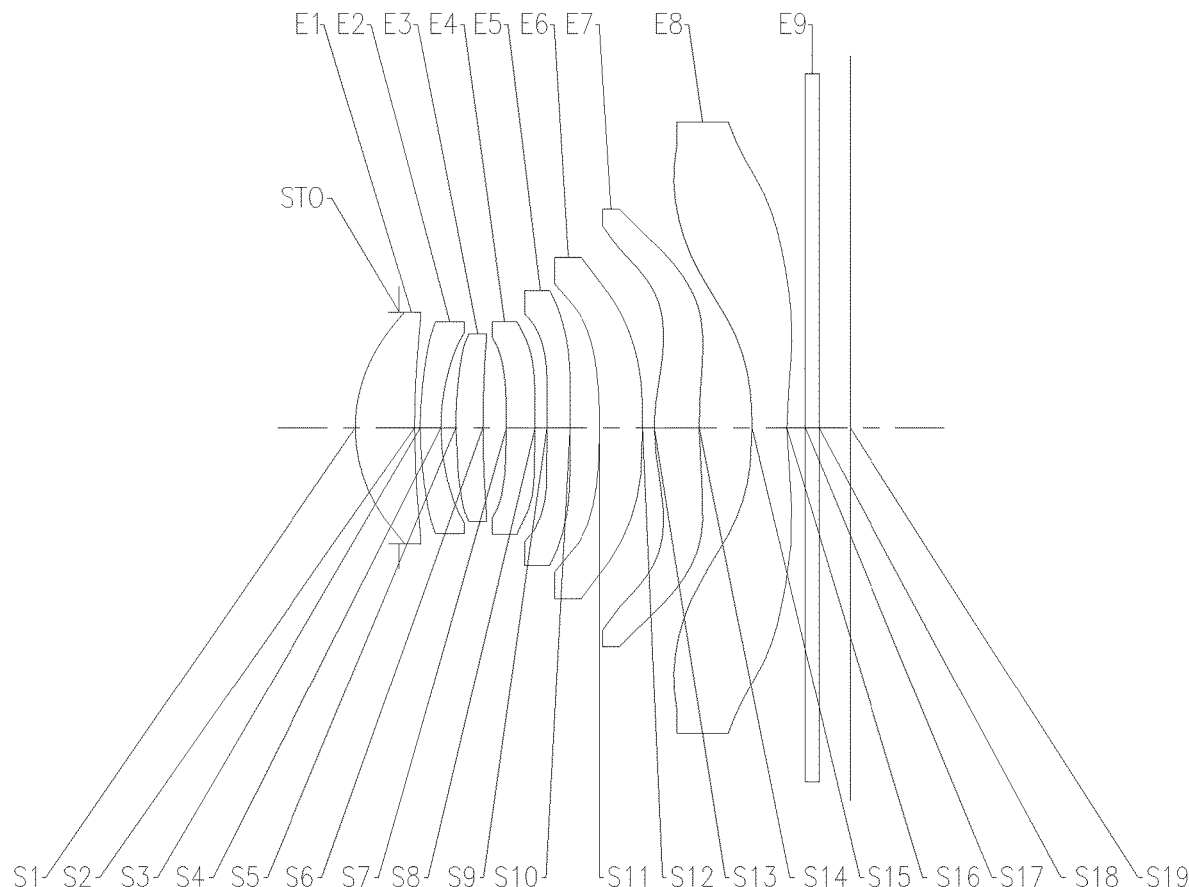
Fig. 7

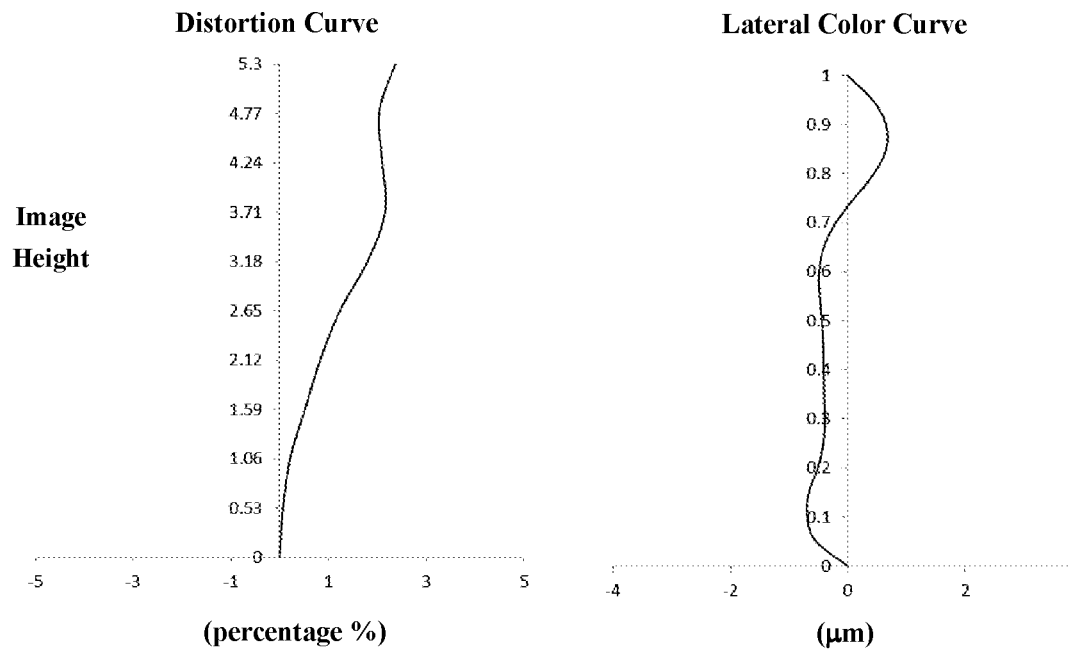
Fig. 10C
Fig. 10D
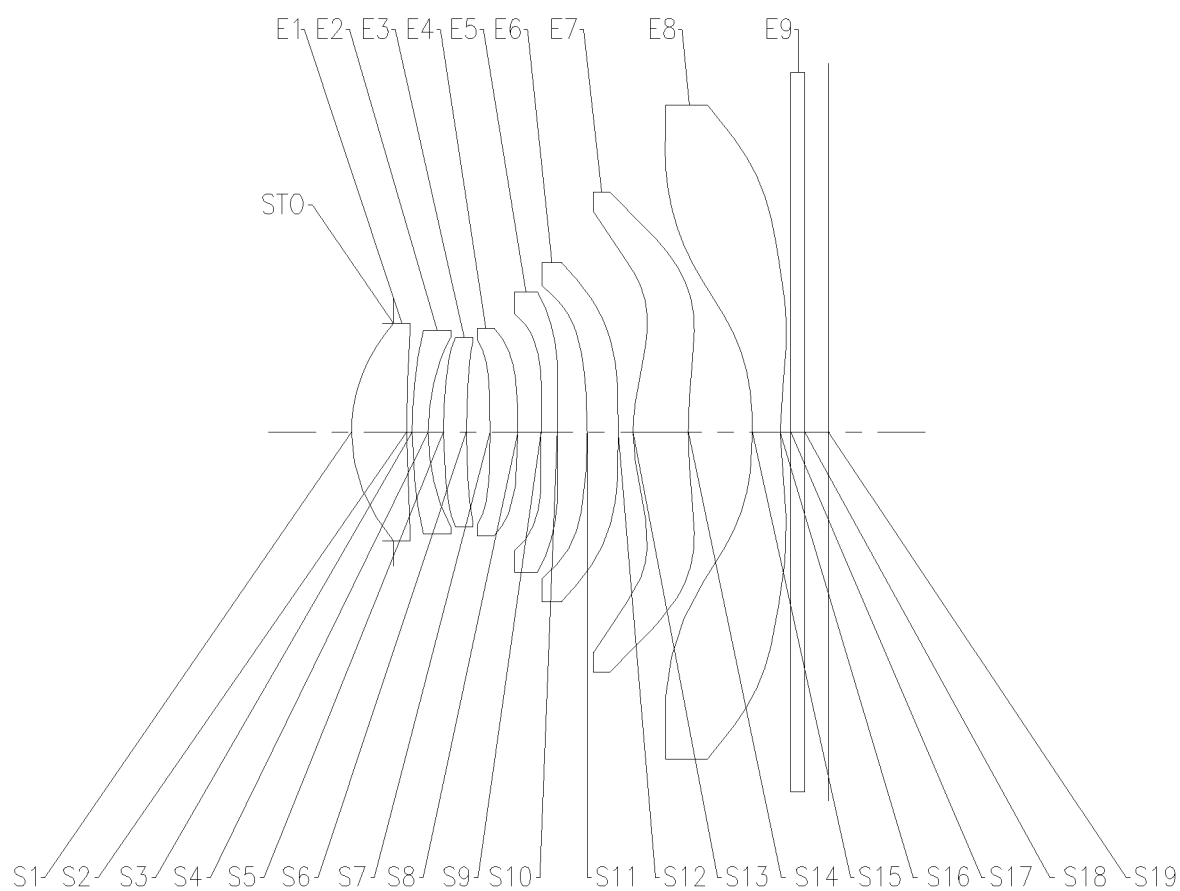
Fig. 11

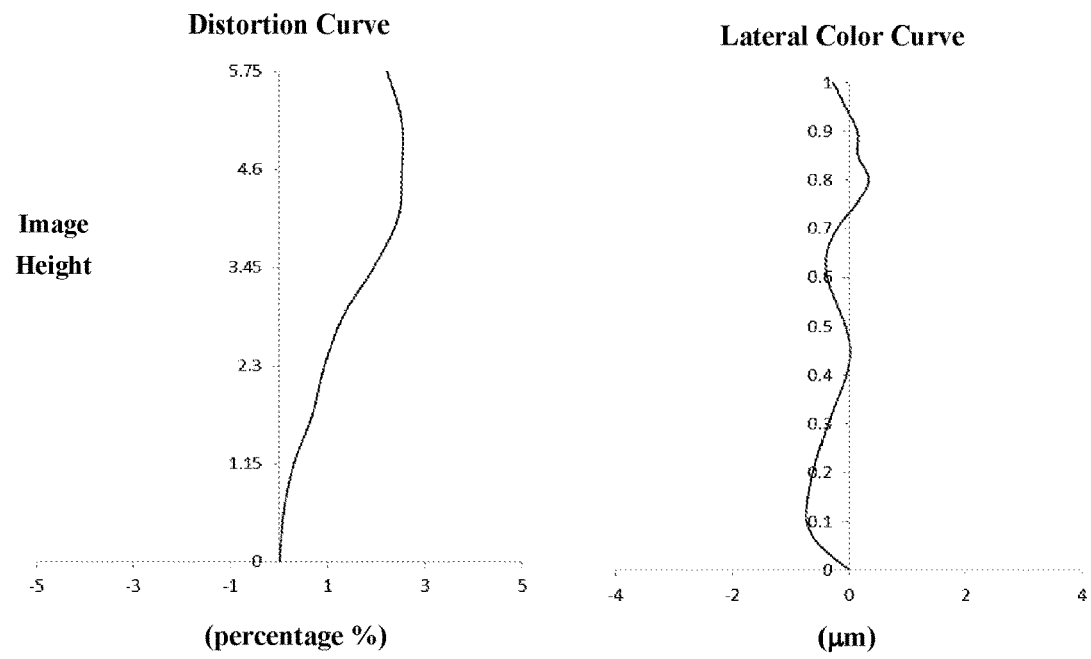
Fig. 14C
Fig. 14D
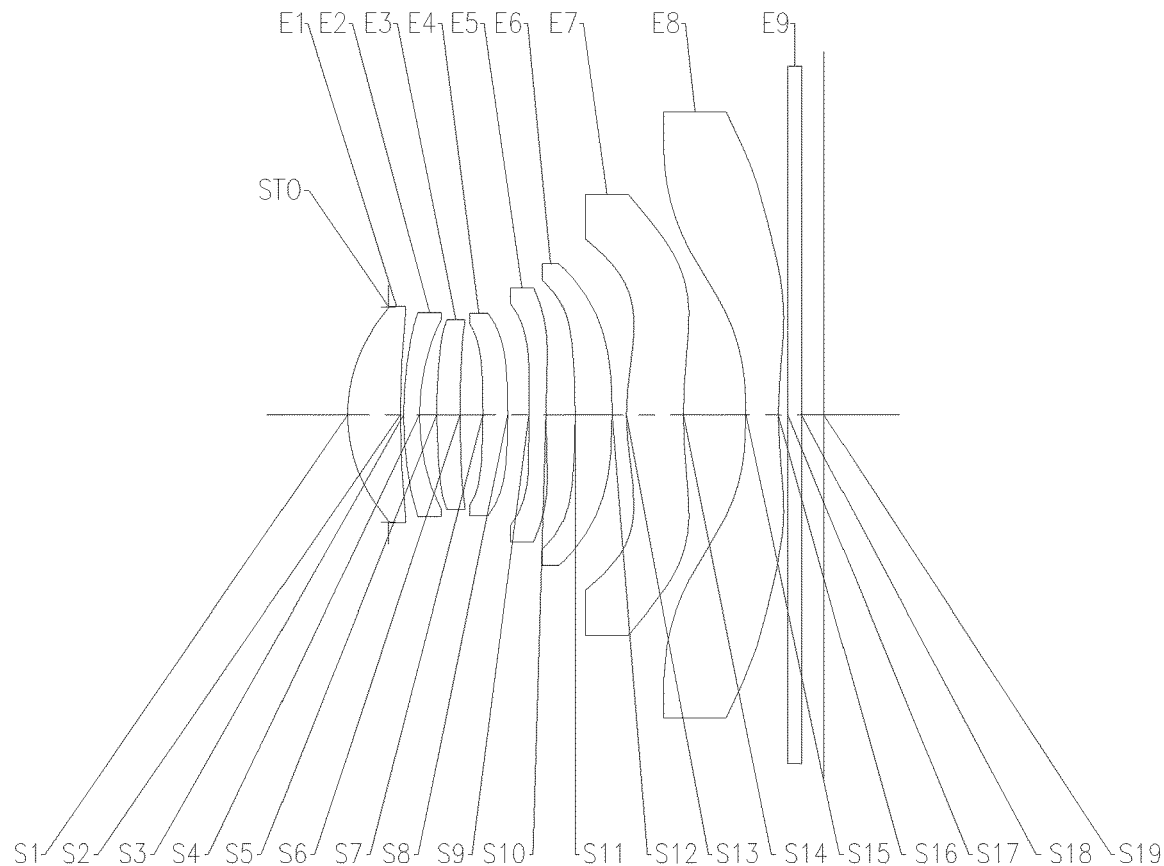
Fig. 15

OPTICAL IMAGING LENS

The present application claims the priority of Chinese patent application No. 202010435060.1, filed on May 21, 2020, which is hereby incorporated by reference in its entirety.

TECHNICAL FIELD

The present application relates to the field of optical elements, and more specifically, to an optical imaging lens.

TECHNICAL BACKGROUND

In recent years, with the development of science and technology, the market demand for optical imaging lenses suitable for portable electronic products has gradually increased. Moreover, the portable electronic products such as mobile phones and tablet computers are all expected to have a smaller volume or a thinner thickness.

Portable devices such as mobile phones are usually provided with camera modules, so that the mobile phones have a camera function. The camera module is usually provided with a Charge-Coupled Device (CCD) type image sensor or a Complementary Metal Oxide Semiconductor (CMOS) type image sensor, and is provided with an optical imaging lens. The optical imaging lens can collect light from an object side, so that imaging light travels along the optical path of the optical imaging lens and is irradiated onto an image sensor. Then, the image sensor converts light signals into electrical signals to form image data. With the continuous improvement of semiconductor process technology, the performance of image sensors continues to improve. Then, the imaging quality of the optical imaging lens has to develop towards high-quality imaging.

Generally, in order to meet higher imaging quality, it is necessary to increase the number of lenses in the optical lens, which tends to increase the size of the lens.

In order to meet the miniaturization demand and the imaging requirements, an optical imaging lens capable of having at least one of the effects of ultra-thin and ultra-large image plane, large aperture, and good imaging quality is desired.

SUMMARY

The present application provides an optical imaging lens suitable for portable electronic products, which can at least or partially solve at least one of the above-mentioned shortcomings in the prior art.

The present application provides an optical imaging lens, comprising, in order from an object side to an image side along an optical axis: a first lens, a second lens, a third lens, a fourth lens, a fifth lens, a sixth lens, a seventh lens and an eighth lens; wherein the first lens may have a positive refractive power, and the seventh lens may have a positive refractive power; and wherein the maximum semi-field of view Semi-FOV of the optical imaging lens and a total effective focal length f of the optical imaging lens may satisfy f×tan(Semi-FOV)>4.5 mm; a radius of curvature R13 of an object side surface of the seventh lens, a radius of curvature R15 of an object side surface of the eighth lens, and a separation distance T78 between the seventh lens and the eighth lens on the optical axis may satisfy −7.0<(R13+R15)/T78<−3.0; and a combined focal length f12 of the first lens and the second lens and an effective focal length f3 of the third lens may satisfy 2.0<f3/f12<6.0.

In an implementation, there is at least one aspherical lens surface from an object side surface of the first lens to an image side surface of the eighth lens.

In an implementation, the maximum semi-field of view Semi-FOV of the optical imaging lens and the total effective focal length f of the optical imaging lens may satisfy 4.5 mm<f×tan(Semi-FOV)<6.0 mm.

In an implementation, a radius of curvature R13 of an object side surface of the seventh lens, a radius of curvature R15 of an object side surface of the eighth lens, and a separation distance T78 between the seventh lens and the eighth lens on the optical axis may satisfy −6.5<(R13+R15)/T78<−3.5.

In an implementation, the total effective focal length f of the optical imaging lens and an effective focal length f7 of the seventh lens may satisfy $0.5 \leq f/f7 \leq 1.0$.

In an implementation, the total effective focal length f of the optical imaging lens and an effective focal length f8 of the eighth lens may satisfy −1.5<f/f8<−1.0.

In an implementation, an effective focal length f2 of the second lens, a radius of curvature R3 of an object side surface of the second lens, and a radius of curvature R4 of an image side surface of the second lens may satisfy 3.0<|f2|/(R3−R4)<8.0.

In an implementation, an effective focal length f1 of the first lens and a radius of curvature R1 of an object side surface of the first lens may satisfy 2.0<f1/R1<2.5.

In an implementation, an effective focal length f3 of the third lens and a radius of curvature R6 of an image side surface of the third lens may satisfy $1.0 \leq f3/R6 \leq 5.0$.

In an implementation, the total effective focal length f of the optical imaging lens and a radius of curvature R11 of an object side surface of the sixth lens may satisfy −1.0<f/R11<0.

In an implementation, a radius of curvature R7 of an object side surface of the fourth lens and a radius of curvature R5 of an object side surface of the third lens may satisfy −6.0<R7/R5<−2.0.

In an implementation, an object side surface of the fourth lens may be concave, and a radius of curvature R7 of an object side surface of the fourth lens and a radius of curvature R11 of an object side surface of the sixth lens may satisfy 0<R11/R7<2.0.

In an implementation, a center thickness CT2 of the second lens and a separation distance T23 between the second lens and the third lens on the optical axis may satisfy $0.9 \leq CT2/T23 \leq 1.5$.

In an implementation, a center thickness CT6 of the sixth lens on the optical axis, a center thickness CT7 of the seventh lens on the optical axis, and a center thickness CT8 of the eighth lens on the optical axis may satisfy 0.5 mm<(CT6+CT7+CT8)/3<0.7 mm.

In an implementation, a center thickness CT3 of the third lens on the optical axis, a center thickness CT4 of the fourth lens on the optical axis, a central thickness CT5 of the fifth lens on the optical axis and a separation distance T56 between the fifth lens and the sixth lens on the optical axis may satisfy 2.0<(CT3+CT4+CT5)/T56<3.5.

In an implementation, an Abbe number V4 of the fourth lens and an Abbe number V6 of the sixth lens may satisfy |V4−V6|<15.

In an implementation, an Abbe number of the fifth lens V5 may satisfy 15<V5<30.

In an implementation, a sum ΣCT of center thicknesses of respective lenses of the first lens to the eighth lens on the optical axis, and a sum ΣAT of separation distances between any two adjacent lenses of the first lens to the eighth lens on the optical axis may satisfy $1.4 \leq \Sigma CT/\Sigma AT \leq 2.0$.

In an implementation, a distance TTL from an object side surface of the first lens to an imaging plane of the optical imaging lens on the optical axis and a half ImgH of a diagonal length of an effective pixel region on the imaging plane of the optical imaging lens may satisfy TTL/ImgH<1.5.

Another aspect of the present application provides an optical imaging lens, comprising, in order from an object side to an image side along an optical axis: a first lens, a second lens, a third lens, a fourth lens, a fifth lens, a sixth lens, a seventh lens and an eighth lens; wherein the first lens may have a positive refractive power, and the seventh lens may have a positive refractive power; wherein the maximum semi-field of view Semi-FOV of the optical imaging lens and a total effective focal length f of the optical imaging lens may satisfy f×tan(Semi-FOV)>4.5 mm; a radius of curvature R13 of an object side surface of the seventh lens, a radius of curvature R15 of an object side surface of the eighth lens, and a separation distance T78 between the seventh lens and the eighth lens on the optical axis may satisfy $-7.0<(R13+R15)/T78<-3.0$; and a center thickness CT2 of the second lens and a separation distance T23 between the second lens and the third lens on the optical axis may satisfy $0.9 \leq CT2/T23 \leq 1.5$.

In an implementation, the maximum semi-field of view Semi-FOV of the optical imaging lens and the total effective focal length f of the optical imaging lens may satisfy 4.5 mm<f×tan(Semi-FOV)<6.0 mm.

In an implementation, a radius of curvature R13 of an object side surface of the seventh lens, a radius of curvature R15 of an object side surface of the eighth lens, and a separation distance T78 between the seventh lens and the eighth lens on the optical axis may satisfy $-6.5<(R13+R15)/T78<-3.5$.

In an implementation, the total effective focal length f of the optical imaging lens and an effective focal length f7 of the seventh lens may satisfy $0.5 \leq f/f7 \leq 1.0$.

In an implementation, the total effective focal length f of the optical imaging lens and an effective focal length f8 of the eighth lens may satisfy $-1.5<f/f8<-1.0$.

In an implementation, an effective focal length f2 of the second lens, a radius of curvature R3 of an object side surface of the second lens, and a radius of curvature R4 of an image side surface of the second lens may satisfy $3.0<|f2|/(R3-R4)<8.0$.

In an implementation, an effective focal length f1 of the first lens and a radius of curvature R1 of an object side surface of the first lens may satisfy $2.0<f1/R1<2.5$.

In an implementation, an effective focal length f3 of the third lens and a radius of curvature R6 of an image side surface of the third lens may satisfy $1.0 \leq f3/R6 \leq 5.0$.

In an implementation, the total effective focal length f of the optical imaging lens and a radius of curvature R11 of an object side surface of the sixth lens may satisfy $-1.0<f/R11<0$.

In an implementation, a radius of curvature R7 of an object side surface of the fourth lens and a radius of curvature R5 of an object side surface of the third lens may satisfy $-6.0<R7/R5<-2.0$.

In an implementation, a combined focal length f12 of the first lens and the second lens and an effective focal length f3 of the third lens may satisfy $2.0<f3/f12<6.0$.

In an implementation, an object side surface of the fourth lens may be concave, and a radius of curvature R7 of an object side surface of the fourth lens and a radius of curvature R11 of an object side surface of the sixth lens may satisfy $0<R11/R7<2.0$.

In an implementation, a center thickness CT6 of the sixth lens on the optical axis, a center thickness CT7 of the seventh lens on the optical axis, and a center thickness CT8 of the eighth lens on the optical axis may satisfy 0.5 mm<(CT6+CT7+CT8)/3<0.7 mm.

In an implementation, a center thickness CT3 of the third lens on the optical axis, a center thickness CT4 of the fourth lens on the optical axis, a central thickness CT5 of the fifth lens on the optical axis and a separation distance T56 between the fifth lens and the sixth lens on the optical axis may satisfy $2.0<(CT3+CT4+CT5)/T56<3.5$.

In an implementation, an Abbe number V4 of the fourth lens and an Abbe number V6 of the sixth lens may satisfy $|V4-V6|<15$.

In an implementation, an Abbe number of the fifth lens V5 may satisfy $15<V5<30$.

In an implementation, a sum $\Sigma CT$ of center thicknesses of respective lenses of the first lens to the eighth lens on the optical axis, and a sum $\Sigma AT$ of separation distances between any two adjacent lenses of the first lens to the eighth lens on the optical axis may satisfy $1.4 \leq \Sigma CT/\Sigma AT \leq 2.0$.

In an implementation, a distance TTL from an object side surface of the first lens to an imaging plane of the optical imaging lens on the optical axis and a half ImgH of a diagonal length of an effective pixel region on the imaging plane of the optical imaging lens may satisfy TTL/ImgH<1.5.

In the present application, eight lenses are adopted. The refractive power, surface type and center thickness of each lens, the on-axis distances between the respective lenses, and the like are reasonably distributed, so that the above-mentioned optical imaging lens has at least one beneficial effect of ultra-thin and ultra-large image plane, large aperture, good imaging quality and so on.

BRIEF DESCRIPTION OF THE DRAWINGS

Other features, objectives and advantages of the present application will become more apparent from the following detailed description of non-limiting implementations in conjunction with the drawings. In the drawings:

FIGS. 2A to 2D show a longitudinal aberration curve, astigmatism curve, distortion curve and lateral color curve of the optical imaging lens according to Embodiment 1, respectively;

FIG. 3 shows a schematic structural diagram of an optical imaging lens according to Embodiment 2 of the present application.

FIGS. 6A to 6D show a longitudinal aberration curve, astigmatism curve, distortion curve and lateral color curve of the optical imaging lens according to Embodiment 3, respectively;

FIG. 7 shows a schematic structural diagram of an optical imaging lens according to Embodiment 4 of the present application.

FIGS. 10A to 10D show a longitudinal aberration curve, astigmatism curve, distortion curve and lateral color curve of the optical imaging lens according to Embodiment 5, respectively;

FIG. 11 shows a schematic structural diagram of an optical imaging lens according to Embodiment 6 of the present application.

FIGS. 14A to 14D show a longitudinal aberration curve, astigmatism curve, distortion curve and lateral color curve of the optical imaging lens according to Embodiment 7, respectively; and FIG. 15 shows a schematic structural diagram of an optical imaging lens according to Embodiment 8 of the present application.

DETAILED DESCRIPTION OF THE EMBODIMENTS

Figure 1:
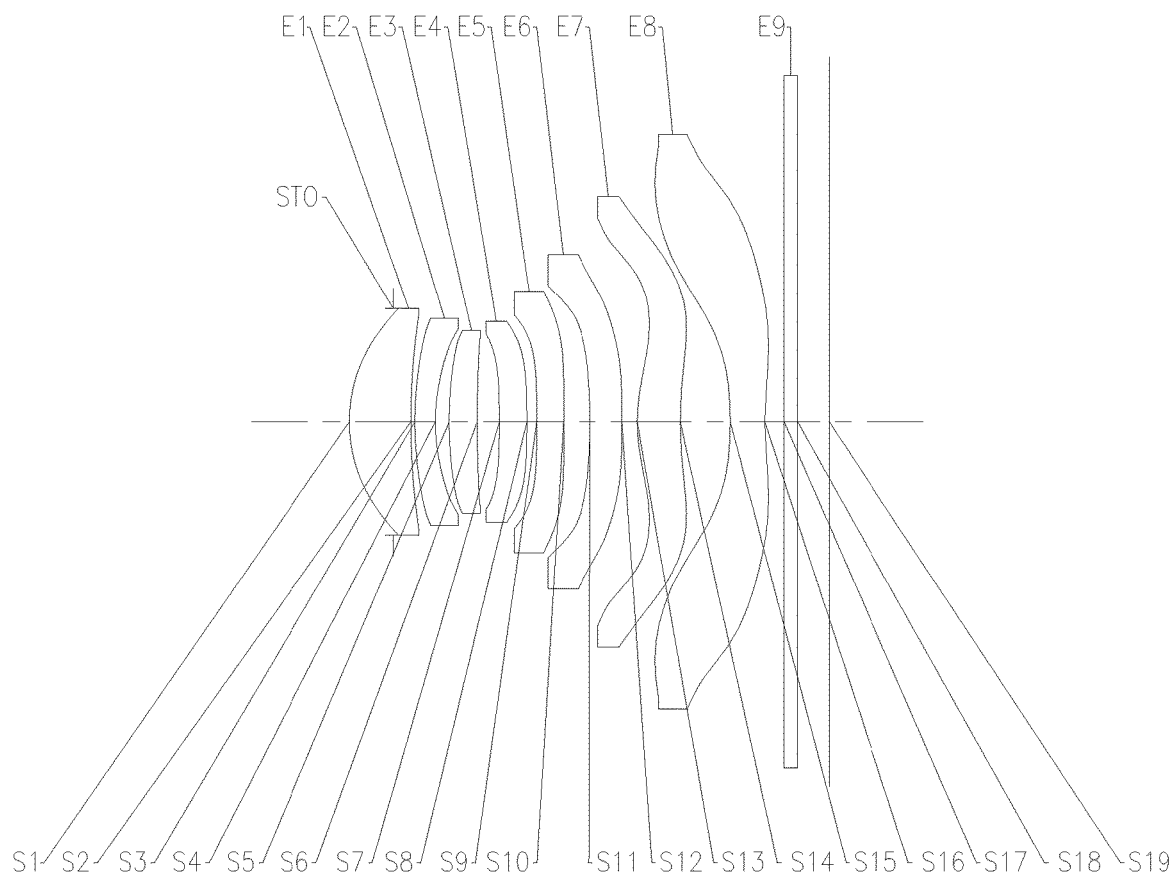
FIG. 1 shows a schematic structural diagram of an optical imaging lens according to Embodiment 1 of the present application.

In order to better understand the present application, various aspects of the present application will be described in more detail with reference to the drawings. It should be understood that the detailed description is merely description of exemplary implementations of the present application, and does not limit the scope of the present application in any way. Throughout the description, the same reference numerals refer to the same elements. The expression "and/or" includes any and all combinations of one or more of the associated listed items.

It should be noted that in the present description, the expressions of "first", "second", "third" etc. are only used to distinguish one feature from another feature, and do not indicate any limitation on the feature. Therefore, without departing from the teachings of the present application, a first lens discussed below may also be referred to as a second lens or a third lens.

In the drawings, for convenience of explanation, the thickness, size, and shape of the lens have been slightly exaggerated. Specifically, the shapes of spherical or aspherical surfaces shown in the drawings are shown by way of example. That is, the shapes of the spherical or aspherical surfaces are not limited to those shown in the drawings. The drawings are only examples and are not drawn strictly to scale.

Herein, a paraxial region refers to a region near an optical axis. If a lens surface is convex and the position of the convex surface is not defined, then it means that the lens surface is convex at least in the paraxial region; and if the lens surface is concave and the position of the concave surface is not defined, then it means that the lens surface is concave at least in the paraxial region. A surface of each lens closest to an object to be captured is referred to as an object side surface of the lens, and a surface of each lens closest to an imaging plane is referred as an image side surface of the lens.

It should also be understood that the terms "comprising", "comprise", "having", "including" and/or "include" when used in the present description, indicate the existence of stated features, elements and/or components, but does not exclude the presence or addition of one or more other features, elements, components and/or combinations thereof. Furthermore, when an expression such as "at least one of" appears before the list of listed features, it modifies the entire list of listed features, rather than the individual elements in the list. In addition, when describing the implementations of the present application, the use of "may" means "one or more implementations of the present application", and, the term "exemplary" refers to an example or illustration.

Unless otherwise defined, all terms (including technical and scientific terms) used herein have the same meanings as commonly understood by those of ordinary skill in the art to which the present application belongs. It should also be understood that the terms (such as those defined in commonly used dictionaries) should be interpreted to have meanings consistent with their meaning in the context of the relevant art and will not be interpreted in an idealized or overly formal sense unless it is clearly defined herein.

It needs to be explained that, in the case of no conflict, the embodiments in the present application and the features in the embodiments can be combined with each other. The present application will be described in detail below in conjunction with embodiments with reference to the drawings.

The features, principles and other aspects of the present application will be described in detail below.

An optical imaging lens according to an exemplary implementation of the present application may include, for example, eight lenses having refractive powers, i.e., a first lens, a second lens, a third lens, a fourth lens, a fifth lens, a sixth lens, a seventh lens and an eighth lens. The eight lenses are arranged in order from an object side to an image side along an optical axis. In the first to eighth lenses, there may be an air gap between any two adjacent lenses.

In an exemplary implementation, the first lens may have a positive refractive power; the second lens may have a positive refractive power or negative refractive power; the third lens may have a positive refractive power or negative refractive power; the fourth lens may have a positive refractive power or negative refractive power; the fifth lens has a positive refractive power or negative refractive power; the sixth lens has a positive refractive power or negative refractive power; the seventh lens can have a positive refractive power; and the eighth lens has a positive refractive power or negative refractive power. The positive and negative distribution of the refractive power of each component of the lens is reasonably controlled to effectively balance and control the low-order aberration of the lens.

In an exemplary implementation, the optical imaging lens of the present application may satisfy a conditional expression of f×tan(Semi-FOV)>4.5 mm, where Semi-FOV is the maximum semi-field of view of the optical imaging lens, and f is a total effective focal length of the optical imaging lens. By satisfying f×Tan(Semi-FOV)>4.5 mm, it is helpful to reasonably set the total effective focal length and field of view of the optical imaging lens, and can be efficiently reduce the size of the optical imaging lens, further making the angle of light deflection small. In addition, it is also helpful to make the optical imaging lens achieve a large image plane and make each lens easy for injection molding.

For example, the optical imaging lens of the present application may satisfy a conditional expression of 4.5 mm<f×tan(Semi-FOV)<6.0 mm. By satisfying 4.5 mm<f× Tan (Semi-FOV)<6.0 mm, it is helpful to further reasonably allocate the effective focal length and field of view of the optical imaging lens, and can be efficiently reduce the size of the optical imaging lens, further making the angle of light deflection small. In addition, it is also helpful to make the optical imaging lens achieve a large image plane and make each lens easy for injection molding.

In an exemplary implementation, the optical imaging lens of the present application may satisfy a conditional expression of −7.0<(R13+R15)/T78<−3.0, where R13 is a radius of curvature of an object side surface of the seventh lens, R15 is a radius of curvature of an object side surface of the eighth lens, and T78 is a separation distance between the seventh lens and the eighth lens on the optical axis. The ratio of the sum of the radii of curvature of the object side surface of the seventh lens and the object side surface of the eighth lens to the air space between the seventh lens and the eighth lens on the optical axis is constrained to be in this range, which is helpful to control the field curvature contribution of each field of view of the optical imaging lens within a reasonable range.

For example, the optical imaging lens of the present application may satisfy a conditional expression of −6.5<(R13+R15)/T78<−3.5. By satisfying −6.5<(R13+R15)/T78<−3.5, it is helpful to control the field curvature contribution of each field of view of the optical imaging lens within a better range.

In an exemplary implementation, the optical imaging lens of the present application may satisfy a conditional expression of 2.0<f3/f12<6.0, where f12 is a combined focal length of the first lens and the second lens, and f3 is an effective focal length of the third lens. The ratio of the effective focal length of the third lens to the combined focal length of the first lens and the second lens is reasonably controlled to be within this range, so that the spherical aberration generated by the third lens can be constrained to be in a reasonable interval, and thereby the spherical aberration generated by the light at the first three lenses is quickly offset and balanced, so as to making the on-axis field of view and its nearby field of view obtain good imaging quality. More specifically, f12 and f3 may satisfy 2.15<f3/f12<5.80.

In an exemplary implementation, the optical imaging lens of the present application may satisfy a conditional expression of 0.5≤f/f7≤1.0, where f is the total effective focal length of the optical imaging lens, and f7 is an effective focal length of the seventh lens. By satisfying 0.5≤f/f7≤1.0, the focal length range of the seventh lens can be controlled, the contribution range of its refractive power can be controlled reasonably, and at the same time, the contribution rate of its negative spherical aberration can be controlled reasonably. Further, the refractive power of the seventh lens can be reasonably balanced with the negative refractive power generated by the negative components in the optical imaging lens.

In an exemplary implementation, the optical imaging lens of the present application may satisfy a conditional expression of −1.5<f/f8<−1.0, where f is the total effective focal length of the optical imaging lens, and f8 is an effective focal length of the eighth lens. By satisfying −1.5<f/f8<−1.0, the focal length range of the eighth lens can be controlled, the contribution range of its refractive power can be controlled reasonably, and at the same time, the contribution rate of its positive spherical aberration can be controlled reasonably. Further, the refractive power of the eighth lens can be reasonably balanced with the positive refractive power generated by the positive components in the optical imaging lens. More specifically, f and f8 may satisfy −1.30<f/f8<−1.15.

In an exemplary implementation, the optical imaging lens of the present application may satisfy a conditional expression of 3.0<|f2|/(R3-R4)<8.0, where f2 is an effective focal length of the second lens, R3 is a radius of curvature of an object side surface of the second lens, and R4 is a radius of curvature of an image side surface of the second lens. By satisfying the conditional expression of 3.0<|f2|/(R3-R4)<8.0, it is conducive to controlling the radii of curvature of the two lens surfaces of the second lens to be within a reasonable range, so that the amount of astigmatism and spherical aberration of the second lens can be controlled to be within a reasonable range, and thereby can be balanced with the amount of astigmatism and spherical aberration generated by other lenses, so as to make the optical imaging lens have good imaging quality. More specifically, f2, R3 and R4 may satisfy 3.30<|f2|/(R3-R4)<7.70.

In an exemplary implementation, the optical imaging lens of the present application may satisfy a conditional expression of 2.0<f1/R1<2.5, where f1 is an effective focal length of the first lens, and R1 is a radius of curvature of an object side surface of the first lens. The ratio of the effective focal length of the first lens to the radius of curvature of its object side surface is reasonably controlled to be within this range, so that the deflection angle of the edge field of view on the first lens can be controlled, and the sensitivity of the optical imaging lens can be effectively reduced. More specifically, f1 and R1 may satisfy 2.05<f1/R1<2.30.

In an exemplary implementation, the optical imaging lens of the present application may satisfy a conditional expression of 1.0≤f3/R6≤5.0, where f3 is an effective focal length of the third lens, and R6 is a radius of curvature of an image side surface of the third lens. The ratio of the effective focal length of the third lens to the radius of curvature of the image side surface of the third lens is constrained to be in this range, which may well control the contribution of the third lens to the fifth-order spherical aberration of the optical imaging lens, and thereby may compensate the third-order spherical aberration generated by the optical imaging lens, so that the optical imaging lens has good imaging quality on the axis.

In an exemplary implementation, the optical imaging lens of the present application may satisfy a conditional expression of −1.0<f/R11<0, where f is the total effective focal length of the optical imaging lens, and R11 is a radius of curvature of an object side surface of the sixth lens. The ratio of the total effective focal length to the radius of curvature of the object side surface of the sixth lens is controlled to be within this range, so that the optical imaging lens can be miniaturized while having high aberration correction capabilities; and the optical imaging lens can achieve better manufacturability. More specifically, f and R11 may satisfy −0.7<f/R11<−0.20.

In an exemplary implementation, the optical imaging lens of the present application may satisfy a conditional expression of −6.0<R7/R5<−2.0, where R7 is a radius of curvature of an object side surface of the fourth lens, and R5 is a radius of curvature of an object side surface of the third lens. The conditional expression −6.0<R7/R5<−2.0 is satisfied to control the coma contribution rate of the third lens and the fourth lens to be within a reasonable range, so that the coma generated by each component of the optical imaging lens can be well balanced, and thereby the optical imaging lens obtains good imaging quality. More specifically, R7 and R5 may satisfy −5.50<R7/R5<−2.10.

In an exemplary implementation, the object side surface of the fourth lens may be concave. The fourth lens with the concave object side surface is helpful to reduce aberrations, thereby improving the image quality of the optical imaging lens.

For example, the optical imaging lens of the present application may satisfy a conditional expression of 0<R11/R7<2.0, where R7 is a radius of curvature of an object side surface of the fourth lens, and R11 is a radius of curvature of an object side surface of the sixth lens. The ratio of the radius of curvature of the object side surface of the sixth lens to that of the object side surface of the fourth lens is controlled, which is helpful to improve the image quality of the optical imaging lens. More specifically, R7 and R11 may satisfy 0.20<R11/R7<0.70.

In an exemplary implementation, the optical imaging lens of the present application may satisfy a conditional expression of 0.9≤CT2/T23≤1.5, where CT2 is a center thickness of the second lens, and T23 is a separation distance between the second lens and the third lens on the optical axis. By satisfying 0.9≤CT2/T23≤1.5, the air gap between the second lens and the third lens, and the center thickness of the second lens can be reasonably adjusted, and thereby the risk of ghost image generated at the second lens and the third lens can be effectively reduced. Moreover, it is helpful to reduce the size of the optical imaging lens.

In an exemplary implementation, the optical imaging lens of the present application may satisfy a conditional expression of 0.5 mm<(CT6+CT7+CT8)/3<0.7 mm, where CT6 is a center thickness of the sixth lens on the optical axis, CT7 is a center thickness of the seventh lens on the optical axis, and CT8 is a center thickness of the eighth lens on the optical axis. By satisfying 0.5 mm<(CT6+CT7+CT8)/3<0.7 mm, the optical imaging lens can have a smaller size. The respective lenses of the optical imaging lens can be better assembled into a lens barrel and matched with other mechanisms to be assembled.

In an exemplary implementation, the optical imaging lens of the present application may satisfy a conditional expression of 2.0<(CT3+CT4+CT5)/T56<3.5, where CT3 is a center thickness of the third lens on the optical axis, CT4 is a center thickness of the fourth lens on the optical axis, CT5 is a center thickness of the fifth lens on the optical axis, and T56 is a separation distance between the fifth lens and the sixth lens on the optical axis. The ratio of the sum of the center thicknesses of the third lens, the fourth lens and the fifth lens to the air space between the fifth lens and the sixth lens on the optical axis is controlled to be between 2 and 3.5, so that the body height of the optical imaging lens can be satisfied, and in the actual processing and assembly of the lenses, the lenses are more conducive to processing and assembly. In addition, the sensitivity of the optical imaging lens to the field curvature is reduced. More specifically, CT3, CT4, CT5 and T56 may satisfy 2.15<(CT3+CT4+CT5)/T56<3.10.

In an exemplary implementation, the optical imaging lens of the present application may satisfy a conditional expression of |V4−V6|<15, where V4 is an Abbe number of the fourth lens, and V6 is an Abbe number of the sixth lens. The material of the fourth lens and the material of the sixth lens located in the middle of the optical imaging lens are selected as materials with a large difference in Abbe number, so that the lateral aberration, longitudinal aberration and chromatic spherical aberration of the optical imaging lens can be strongly corrected, thereby better ensuring the image quality of the optical imaging lens.

In an exemplary implementation, the optical imaging lens of the present application may satisfy a conditional expression of 15<V5<30, where V5 is an Abbe number of the fifth lens. The Abbe number of the fifth lens located in the middle of the optical imaging lens is controlled to be between 15 and 30, so that the Abbe number of the lens is small, and thereby the fifth lens has a small dispersion ability to ensure that the optical imaging lens has better chromatic aberration and higher image quality. For example, V5 may satisfy 15<V5<26.5.

In an exemplary implementation, the optical imaging lens of the present application may satisfy a conditional expression of 1.4≤ΣCT/ΣAT≤2.0, where ΣCT is a sum of center thicknesses of respective lenses of the first lens to the eighth lens on the optical axis, and ΣAT is a sum of separation distances between any two adjacent lenses of the first lens to the eighth lens on the optical axis. For example, ΣCT=CT1+CT2+CT3+CT4+CT5+CT6+CT7+CT8, and ΣAT=T12+T23+T34+T45+T56+T67+T78.

Among them, CT1 is the center thickness of the first lens on the optical axis, CT2 is the center thickness of the second lens on the optical axis, CT3 to CT8 are analogous to these (refer to the previous definition), T12 is the separation distance between the first lens and the second lens on the optical axis, T23 is the separation distance between the second lens and the third lens on the optical axis, and T34 to T78 are analogous to these. The ratio of the sum of the center thicknesses of the respective lenses of the first lens to the eighth lens on the optical axis to the sum of the separation distances between any two adjacent lenses of the first lens to the eighth lens on the optical axis is constrained to be in this range, so that the distortion of the optical imaging lens can be reasonably controlled, and the optical imaging lens has good distortion performance. More specifically, ΣCT and ΣAT may satisfy 1.41≤ΣCT/ΣAT≤1.95.

In an exemplary implementation, the optical imaging lens of the present application may satisfy a conditional expression of TTL/ImgH<1.5, where TTL is a distance from the object side surface of the first lens to an imaging plane of the optical imaging lens on the optical axis, and ImgH is a half of a diagonal length of an effective pixel region on the imaging plane of the optical imaging lens. The ratio of the total optical length to the half-image height of the optical imaging lens is constrained to be in this range, so that the optical imaging lens can be ultra-thin.

In an exemplary implementation, the optical imaging lens described above may further include at least one diaphragm. The diaphragm can be set at an appropriate position as needed, for example, between the object side and the first lens. Optionally, the optical imaging lens described above may further include a filter for correcting color deviation and/or protective glass for protecting a photosensitive element located on an imaging plane.

The optical imaging lens according to the above-mentioned implementations of the present application may adopt multiple lens sheets, for example, eight sheets described above. The refractive power, surface type, center thickness of each lens, the on-axis distances between the respective lenses, and the like are reasonably distributed, which can effectively reduce the volume of the optical imaging lens, reduce the length of the optical imaging lens, reduce the sensitivity of the optical imaging lens, and improve the processability of the optical imaging lens, so that the optical imaging lens is more conducive to production and processing and is applicable for portable electronic products. At the same time, the optical imaging lens of the present application further has excellent performance such as ultra-large image plane, large aperture, and good imaging quality.

In the implementations of the present application, at least one of lens surfaces of the respective lenses is an aspherical lens surface, that is, at least one side surface from the object side surface of the first lens to the image side surface of the eighth lens is an aspherical lens surface. An aspherical lens is characterized in that the curvature changes continuously from the center of the lens to the periphery of the lens. Unlike a spherical lens having a constant curvature from the center of the lens to the periphery of the lens, the aspherical lens has better radius-of-curvature properties, and has the advantages of improving distortion aberration and improving astigmatism aberration. By adopting the aspherical lens, the aberrations that occur during imaging can be eliminated as much as possible, thereby improving the imaging quality. Optionally, at least one of an object side surface and an image side surface of each of the first lens, the second lens, the third lens, the fourth lens, the fifth lens, the sixth lens, the seventh lens and the eighth lens is an aspherical lens surface. Optionally, both an object side surface and an image side surface of each of the first lens, the second lens, the third lens, the fourth lens, the fifth lens, the sixth lens, the seventh lens and the eighth lens are aspherical lens surfaces.

However, it should be understood by those skilled in the art that the number of lenses constituting the optical imaging lens can be changed without departing from the technical solution claimed in the present application, to obtain respective results and advantages described in the description. For example, although eight lenses have been described in the implementations as an example, the optical imaging lens is not limited to including the eight lenses. If necessary, the optical imaging lens may also include other numbers of lenses.

Specific embodiments of the optical imaging lens applicable to the above-mentioned implementations will be further described below with reference to the drawings.

Embodiment 1

An optical imaging lens according to Embodiment 1 of the present application will be described below with reference to FIGS. 1 to 2D. FIG. 1 shows a schematic structural diagram of the optical imaging lens according to Embodiment 1 of the present application.

As shown in FIG. 1, the optical imaging lens includes a diaphragm STO, a first lens E1, a second lens E2, a third lens E3, a fourth lens E4, a fifth lens E5, a sixth lens E6, a seventh lens E7, an eighth lens E8 and a filter E9 in order from an object side to an image side along an optical axis.

The first lens E1 has a positive refractive power, and has a convex object side surface S1 and a concave image side surface S2. The second lens E2 has a negative refractive power, and has a convex object side surface S3 and a concave image side surface S4. The third lens E3 has a positive refractive power, and has a convex object side surface S5 and a concave image side surface S6. The fourth lens E4 has a negative refractive power, and has a concave object side surface S7 and a convex image side surface S8. The fifth lens E5 has a negative refractive power, and has a concave object side surface S9 and a concave image side surface S10. The sixth lens E6 has a negative refractive power, and has a concave object side surface S11 and a concave image side surface S12. The seventh lens E7 has a positive refractive power, and has a convex object side surface S13 and a concave image side surface S14. The eighth lens E8 has a negative refractive power, and has a concave object side surface S15 and a concave image side surface S16. The filter E9 has an object side surface S17 and an image side surface S18. The optical imaging lens has an imaging plane S19, and light from an object passes through the respective surfaces S1 to S18 in order and finally forms an image on the imaging plane S19.

Table 1 shows a table of basic parameters of the optical imaging lens of Embodiment 1, wherein the units of the radius of curvature, thickness/distance, and focal length are all millimeters (mm).

TABLE 1

| Surface No. | Surface type | Radius of curvature | Thickness/ distance | Material Refractive index | Material Abbe number | Focal length | Conic coefficient |
|---|---|---|---|---|---|---|---|
| OBJ | Spherical | Infinity | Infinity | | | | |
| STO | Spherical | Infinity | −0.6859 | | | | |
| S1 | Aspherical | 2.3878 | 0.9600 | 1.546 | 56.11 | 5.45 | 0.1612 |
| S2 | Aspherical | 10.3598 | 0.0629 | | | | 6.2724 |
| S3 | Aspherical | 5.2306 | 0.3200 | 1.678 | 19.25 | −12.73 | 1.6936 |
| S4 | Aspherical | 3.1759 | 0.2170 | | | | −0.0470 |
| S5 | Aspherical | 7.0985 | 0.4366 | 1.536 | 55.74 | 20.51 | 12.9295 |
| S6 | Aspherical | 19.5580 | 0.3454 | | | | 27.9040 |
| S7 | Aspherical | −16.4404 | 0.4300 | 1.645 | 23.49 | −142.47 | 0.0000 |
| S8 | Aspherical | −20.2308 | 0.1538 | | | | 33.2610 |
| S9 | Aspherical | −137.3249 | 0.4200 | 1.645 | 23.49 | −57.09 | −99.0000 |
| S10 | Aspherical | 50.3264 | 0.4166 | | | | −99.0000 |
| S11 | Aspherical | −11.0872 | 0.5000 | 1.619 | 25.92 | −16.39 | 9.1573 |
| S12 | Aspherical | 122.1472 | 0.2400 | | | | 99.0000 |
| S13 | Aspherical | 2.6003 | 0.6723 | 1.536 | 55.74 | 7.11 | −0.9228 |
| S14 | Aspherical | 7.4342 | 0.7794 | | | | 0.4317 |
| S15 | Aspherical | −7.2854 | 0.5400 | 1.536 | 55.74 | −5.27 | 0.3373 |
| S16 | Aspherical | 4.7492 | 0.3009 | | | | −1.1369 |
| S17 | Spherical | Infinity | 0.2100 | 1.517 | 64.17 | | |
| S18 | Spherical | Infinity | 0.4951 | | | | |
| S19 | Spherical | Infinity | | | | | |

In Embodiment 1, a value of a total effective focal length f of the optical imaging lens is 6.65 mm, a value of an on-axis distance TTL between the object side surface S1 of the first lens E1 to the image plane S19 is 7.50 mm, and a value of the maximum field of view FOV is 75.9°.

In Embodiment 1, both the object side surface and image side surface of any one of the first lens E1 to the eighth lens E8 are aspherical, and the surface shape x of each aspherical lens can be defined by using but not limited to the following aspherical formula:

$$x = \frac{ch^2}{1 + \sqrt{1-(k+1)c^2h^2}} + \sum A_i h^i \quad (1)$$

where x is a distance vector height from a vertex of the aspherical surface when the aspherical surface is at a height of h along the optical axis direction; c is paraxial curvature of the aspherical surface, c=1/R (that is, the paraxial curvature c is the reciprocal of the radius of curvature R in Table 1 above); k is a conic coefficient; and $A_i$ is a correction coefficient of an i-th order of the aspherical surface. Higher-order coefficients $A_4, A_6, A_8, A_{10}, A_{12}, A_{14}, A_{16}, A_{18}, A_{20}, A_{22}, A_{24}, A_{26}, A_{28}$ and $A_{30}$ of each aspherical lens surface of S1 to S16 that are applicable in Embodiment 1 are given in Table 2 below.

Figure 2A:
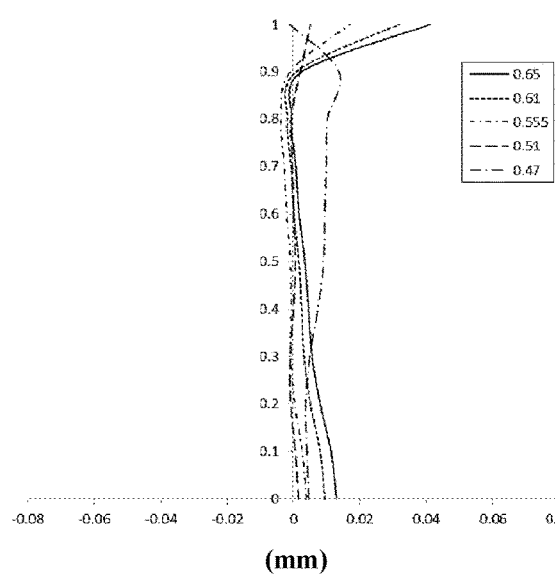
Figure 2B:
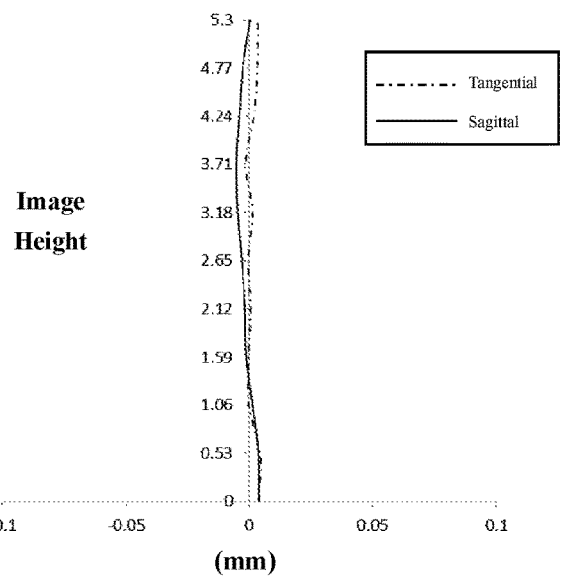

FIG. 2A shows a longitudinal aberration curve of the optical imaging lens according to Embodiment 1, which represents the deviation of the converged focal point after light of different wavelengths passes through the camera lens. FIG. 2B shows an astigmatism curve of the optical imaging lens according to Embodiment 1, which represents the curvature of the tangential image plane and the curvature of the sagittal image plane. FIG. 2C shows a distortion curve of the optical imaging lens according to Embodiment 1, which represents distortion magnitude values corresponding to different image heights. FIG. 2D shows a lateral color curve of the optical imaging lens according to Embodiment 1, which represents the deviation of different image heights on the imaging plane after light passes through the camera lens. According to FIGS. 2A to 2D, it can be seen that the optical imaging lens given in Embodiment 1 can achieve good imaging quality.

Embodiment 2

An optical imaging lens according to Embodiment 2 of the present application will be described below with reference to FIGS. 3 to 4D. In this embodiment and the following embodiments, for the sake of brevity, the description of parts similar to those in Embodiment 1 will be omitted. FIG. 3 shows a schematic structural diagram of the optical imaging lens according to Embodiment 2 of the present application.

As shown in FIG. 3, the optical imaging lens includes a diaphragm STO, a first lens E1, a second lens E2, a third lens E3, a fourth lens E4, a fifth lens E5, a sixth lens E6, a seventh lens E7, an eighth lens E8 and a filter E9 in order from an object side to an image side along an optical axis.

The first lens E1 has a positive refractive power, and has a convex object side surface S1 and a concave image side surface S2. The second lens E2 has a negative refractive power, and has a convex object side surface S3 and a concave image side surface S4. The third lens E3 has a positive refractive power, and has a convex object side

TABLE 2

| Surface No. | A4 | A6 | A8 | A10 | A12 | A14 | A16 |
|---|---|---|---|---|---|---|---|
| S1 | −5.1450E−02 | −1.5655E−02 | −4.8143E−03 | −1.2990E−03 | −2.9574E−04 | −4.5813E−05 | −8.7823E−08 |
| S2 | −2.1916E−02 | 3.6927E−03 | −2.1455E−03 | 4.8625E−04 | −1.3779E−04 | 7.2045E−05 | −6.1658E−06 |
| S3 | −5.0452E−02 | 1.9636E−02 | −2.4038E−04 | 7.8345E−04 | −2.2104E−05 | 9.6110E−05 | 9.9930E−06 |
| S4 | −1.3964E−02 | 1.2925E−02 | 1.6002E−03 | 1.2720E−04 | −1.6023E−04 | −4.0369E−05 | −8.2132E−07 |
| S5 | 1.3193E−02 | 1.2248E−02 | 4.3896E−03 | 6.8455E−04 | −1.1774E−05 | −1.3267E−05 | 4.3986E−06 |
| S6 | −6.0797E−03 | 3.8673E−03 | 1.5226E−03 | 2.8169E−04 | 2.4846E−05 | 3.8179E−06 | 8.7118E−07 |
| S7 | −1.3864E−01 | −1.1082E−02 | −6.3366E−04 | −1.3575E−04 | −3.1522E−05 | −2.2276E−05 | 6.9815E−06 |
| S8 | −2.5263E−01 | −5.8492E−03 | 4.0007E−03 | 1.9030E−03 | 1.0282E−03 | 4.1702E−04 | 2.3569E−04 |
| S9 | −3.2917E−01 | −6.8960E−03 | −2.9644E−03 | −1.2326E−03 | 1.5252E−04 | −5.5874E−05 | 1.1688E−04 |
| S10 | −3.6373E−01 | 1.7477E−02 | 2.0508E−03 | −1.9558E−04 | 2.3243E−04 | −5.3751E−04 | 1.4009E−05 |
| S11 | −3.9979E−01 | −5.5054E−02 | 1.1077E−02 | 1.2473E−03 | 3.3233E−03 | −1.2420E−04 | −8.3914E−04 |
| S12 | −8.8298E−01 | 1.6789E−01 | −2.7155E−02 | 2.5388E−02 | −1.0169E−02 | 8.1120E−04 | −9.6986E−04 |
| S13 | −3.2147E+00 | 4.8451E−01 | 5.7655E−03 | 2.9307E−02 | −2.6167E−02 | −4.2865E−03 | 8.8158E−04 |
| S14 | −2.1639E+00 | 2.3165E−01 | 6.0021E−02 | −3.8194E−02 | 1.5639E−02 | −7.0232E−03 | 2.4805E−03 |
| S15 | −8.8497E−02 | 6.6326E−01 | −3.2422E−01 | 1.2660E−01 | −3.2512E−02 | −1.1251E−03 | 4.3821E−03 |
| S16 | −4.0695E+00 | 8.7159E−01 | −2.3348E−01 | 1.6113E−01 | −5.9436E−02 | 8.4335E−03 | −9.1386E−03 |

| Surface No. | A18 | A20 | A22 | A24 | A26 | A28 | A30 |
|---|---|---|---|---|---|---|---|
| S1 | 6.5259E−06 | 4.4798E−06 | 0.0000E+00 | 0.0000E+00 | 0.0000E+00 | 0.0000E+00 | 0.0000E+00 |
| S2 | 9.6631E−06 | −8.6419E−07 | 0.0000E+00 | 0.0000E+00 | 0.0000E+00 | 0.0000E+00 | 0.0000E+00 |
| S3 | 5.8950E−06 | −2.3391E−06 | 0.0000E+00 | 0.0000E+00 | 0.0000E+00 | 0.0000E+00 | 0.0000E+00 |
| S4 | 6.1918E−06 | 1.9505E−06 | 0.0000E+00 | 0.0000E+00 | 0.0000E+00 | 0.0000E+00 | 0.0000E+00 |
| S5 | 3.4211E−06 | −3.5973E−07 | 0.0000E+00 | 0.0000E+00 | 0.0000E+00 | 0.0000E+00 | 0.0000E+00 |
| S6 | 1.1305E−06 | 2.9103E−08 | 0.0000E+00 | 0.0000E+00 | 0.0000E+00 | 0.0000E+00 | 0.0000E+00 |
| S7 | −1.4115E−06 | 2.3402E−06 | 0.0000E+00 | 0.0000E+00 | 0.0000E+00 | 0.0000E+00 | 0.0000E+00 |
| S8 | 7.0372E−05 | 2.4844E−05 | 0.0000E+00 | 0.0000E+00 | 0.0000E+00 | 0.0000E+00 | 0.0000E+00 |
| S9 | 3.2366E−05 | 2.3624E−05 | 0.0000E+00 | 0.0000E+00 | 0.0000E+00 | 0.0000E+00 | 0.0000E+00 |
| S10 | 1.1137E−05 | 2.3651E−05 | 0.0000E+00 | 0.0000E+00 | 0.0000E+00 | 0.0000E+00 | 0.0000E+00 |
| S11 | −3.8353E−04 | −7.2092E−05 | 0.0000E+00 | 0.0000E+00 | 0.0000E+00 | 0.0000E+00 | 0.0000E+00 |
| S12 | 3.9656E−04 | −9.7149E−05 | 0.0000E+00 | 0.0000E+00 | 0.0000E+00 | 0.0000E+00 | 0.0000E+00 |
| S13 | 2.2915E−03 | −4.8597E−04 | −1.9045E−04 | −2.3458E−04 | 0.0000E+00 | 0.0000E+00 | 0.0000E+00 |
| S14 | −7.1463E−04 | −6.3886E−04 | −7.9624E−04 | −2.2746E−04 | −5.2038E−05 | 0.0000E+00 | 0.0000E+00 |
| S15 | 1.2432E−03 | −4.4005E−03 | 4.1143E−03 | −2.2245E−03 | 7.3895E−04 | −1.2453E−04 | −1.1187E−06 |
| S16 | 5.9935E−03 | −3.2774E−03 | 4.0344E−03 | −1.6310E−03 | 8.0133E−04 | −4.0233E−04 | 1.0067E−04 | surface S5 and a concave image side surface S6. The fourth lens E4 has a positive refractive power, and has a concave object side surface S7 and a convex image side surface S8. The fifth lens E5 has a negative refractive power, and has a concave object side surface S9 and a convex image side surface S10. The sixth lens E6 has a negative refractive power, and has a concave object side surface S11 and a concave image side surface S12. The seventh lens E7 has a positive refractive power, and has a convex object side surface S13 and a concave image side surface S14. The eighth lens E8 has a negative refractive power, and has a concave object side surface S15 and a concave image side surface S16. The filter E9 has an object side surface S17 and an image side surface S18. The optical imaging lens has an imaging plane S19, and light from an object passes through the respective surfaces S1 to S18 in order and finally forms an image on the imaging plane S19.

In Embodiment 2, a value of a total effective focal length f of the optical imaging lens is 6.70 mm, a value of an on-axis distance TTL between the object side surface S1 of the first lens E1 to the image plane S19 is 7.80 mm, and a value of the maximum field of view FOV is 69.8°.

Table 3 shows a table of basic parameters of the optical imaging lens of Embodiment 2, wherein the units of the radius of curvature, thickness/distance, and focal length are all millimeters (mm). Table 4 shows higher-order coefficients of each aspherical lens surface that are applicable in Embodiment 2, wherein the surface shape of each aspherical surface can be defined by formula (1) given in Embodiment 1 described above.

TABLE 3

| Surface No. | Surface type | Radius of curvature | Thickness/ distance | Material Refractive index | Abbe number | Focal length | Conic coefficient |
|---|---|---|---|---|---|---|---|
| OBJ | Spherical | Infinity | Infinity | | | | |
| STO | Spherical | Infinity | −0.6620 | | | | |
| S1 | Aspherical | 2.5453 | 0.9355 | 1.546 | 56.11 | 5.81 | −0.0213 |
| S2 | Aspherical | 11.2055 | 0.0300 | | | | 9.8576 |
| S3 | Aspherical | 4.7409 | 0.3200 | 1.677 | 19.20 | −13.19 | 1.5033 |
| S4 | Aspherical | 3.0216 | 0.2819 | | | | 0.1068 |
| S5 | Aspherical | 6.9998 | 0.4206 | 1.544 | 56.00 | 28.54 | 7.1830 |
| S6 | Aspherical | 12.4425 | 0.4224 | | | | −18.5216 |
| S7 | Aspherical | −15.4572 | 0.4300 | 1.559 | 44.78 | 100.78 | 0.0000 |
| S8 | Aspherical | −12.2615 | 0.0904 | | | | 32.0807 |
| S9 | Aspherical | −17.5125 | 0.4200 | 1.660 | 20.56 | −28.44 | 90.5146 |
| S10 | Aspherical | −234.1893 | 0.5820 | | | | 99.0000 |
| S11 | Aspherical | −30.0330 | 0.5140 | 1.584 | 34.28 | −25.18 | 20.2312 |
| S12 | Aspherical | 29.2694 | 0.1850 | | | | 37.5857 |
| S13 | Aspherical | 2.2143 | 0.6330 | 1.536 | 55.74 | 6.80 | −0.9791 |
| S14 | Aspherical | 5.0700 | 0.9797 | | | | −0.4982 |
| S15 | Aspherical | −7.6982 | 0.5400 | 1.536 | 55.74 | −5.58 | −0.0927 |
| S16 | Aspherical | 5.0184 | 0.3065 | | | | −0.9403 |
| S17 | Spherical | Infinity | 0.2100 | 1.517 | 64.17 | | |
| S18 | Spherical | Infinity | 0.4990 | | | | |
| S19 | Spherical | Infinity | | | | | |

TABLE 4

| Surface No. | A4 | A6 | A8 | A10 | A12 | A14 | A16 |
|---|---|---|---|---|---|---|---|
| S1 | −1.5972E−02 | −1.1003E−02 | −3.7791E−03 | −9.5689E−04 | −1.6551E−04 | 4.4773E−06 | 1.1650E−05 |
| S2 | −2.8002E−02 | −1.7809E−03 | −1.4968E−03 | 4.3406E−04 | −6.6878E−05 | 4.5603E−05 | −1.3463E−05 |
| S3 | −4.8541E−02 | 1.6060E−02 | 2.6226E−04 | 5.4969E−04 | −7.0986E−05 | −1.0536E−05 | −2.0840E−05 |
| S4 | −1.0201E−02 | 1.3200E−02 | 6.7614E−04 | −1.9375E−04 | −2.1229E−04 | −1.2600E−04 | −5.2475E−05 |
| S5 | 7.7061E−03 | 1.4979E−02 | 4.1997E−03 | 9.5296E−04 | 2.3282E−04 | 4.9237E−05 | 7.5417E−06 |
| S6 | −2.2714E−02 | 2.3661E−03 | 9.7845E−04 | 2.2109E−04 | 9.0548E−05 | 3.6223E−05 | 1.5578E−05 |
| S7 | −1.8894E−01 | −2.1304E−02 | −2.9960E−03 | −9.3596E−04 | −2.6535E−04 | −5.9218E−05 | −8.9950E−06 |
| S8 | −2.7376E−01 | −7.5224E−03 | 2.3517E−03 | 4.9805E−04 | 8.1624E−04 | 4.6338E−04 | 1.4835E−04 |
| S9 | −3.1598E−01 | 1.5780E−02 | −1.9234E−03 | −6.4013E−04 | 4.9620E−04 | 2.4523E−04 | 7.8162E−06 |
| S10 | −4.4856E−01 | 1.5260E−02 | 9.2307E−03 | 6.3712E−03 | 2.7419E−03 | 6.5986E−04 | 8.8178E−05 |
| S11 | −6.0474E−01 | −6.6597E−02 | 4.1279E−02 | 2.0605E−02 | 3.3563E−03 | −3.6525E−04 | −1.6394E−03 |
| S12 | −1.2810E+00 | 2.8708E−01 | −5.3473E−02 | 7.4830E−03 | −1.7718E−02 | 5.3019E−03 | −1.4120E−03 |
| S13 | −3.9808E+00 | 7.8982E−01 | −1.3665E−03 | −3.4418E−02 | −1.5377E−02 | 1.1495E−02 | −1.4691E−03 |
| S14 | −2.5112E+00 | 2.6831E−01 | 1.2036E−01 | −5.9871E−02 | 3.7122E−02 | −4.4226E−03 | 2.0540E−03 |
| S15 | 5.6725E−02 | 6.7100E−01 | −3.7245E−01 | 1.5509E−01 | −5.1359E−02 | 4.3719E−03 | 2.2996E−03 |
| S16 | −4.2506E+00 | 1.1322E+00 | −3.3502E−01 | 1.3055E−01 | −6.1203E−02 | 4.4461E−04 | 2.1402E−03 |

| Surface No. | A18 | A20 | A22 | A24 | A26 | A28 | A30 |
|---|---|---|---|---|---|---|---|
| S1 | 7.5379E−06 | 4.5966E−07 | 0.0000E+00 | 0.0000E+00 | 0.0000E+00 | 0.0000E+00 | 0.0000E+00 |
| S2 | 6.6024E−06 | −1.1340E−06 | 0.0000E+00 | 0.0000E+00 | 0.0000E+00 | 0.0000E+00 | 0.0000E+00 |
| S3 | 1.5230E−06 | −3.6730E−07 | 0.0000E+00 | 0.0000E+00 | 0.0000E+00 | 0.0000E+00 | 0.0000E+00 |
| S4 | −1.8051E−05 | −3.8649E−06 | 0.0000E+00 | 0.0000E+00 | 0.0000E+00 | 0.0000E+00 | 0.0000E+00 |
| S5 | 1.3077E−06 | 8.9816E−07 | 0.0000E+00 | 0.0000E+00 | 0.0000E+00 | 0.0000E+00 | 0.0000E+00 |
| S6 | 5.3793E−06 | 2.3672E−06 | 0.0000E+00 | 0.0000E+00 | 0.0000E+00 | 0.0000E+00 | 0.0000E+00 |

TABLE 4-continued

| | | | | | | | |
|---|---|---|---|---|---|---|---|
| S7 | 1.4986E−06 | 7.0819E−07 | 0.0000E+00 | 0.0000E+00 | 0.0000E+00 | 0.0000E+00 | 0.0000E+00 |
| S8 | 7.2604E−05 | 2.0360E−05 | 0.0000E+00 | 0.0000E+00 | 0.0000E+00 | 0.0000E+00 | 0.0000E+00 |
| S9 | 3.3382E−05 | 8.0136E−06 | 0.0000E+00 | 0.0000E+00 | 0.0000E+00 | 0.0000E+00 | 0.0000E+00 |
| S10 | 4.5026E−05 | −1.0882E−05 | 0.0000E+00 | 0.0000E+00 | 0.0000E+00 | 0.0000E+00 | 0.0000E+00 |
| S11 | −6.6346E−04 | −2.2110E−04 | 0.0000E+00 | 0.0000E+00 | 0.0000E+00 | 0.0000E+00 | 0.0000E+00 |
| S12 | −2.0257E−04 | −4.5055E−04 | 0.0000E+00 | 0.0000E+00 | 0.0000E+00 | 0.0000E+00 | 0.0000E+00 |
| S13 | −1.1585E−03 | 3.0938E−04 | −1.8061E−05 | −2.2517E−04 | 0.0000E+00 | 0.0000E+00 | 0.0000E+00 |
| S14 | −7.3546E−03 | 2.3385E−03 | −6.9248E−04 | −1.8932E−05 | −5.4239E−04 | 0.0000E+00 | 0.0000E+00 |
| S15 | −7.8021E−04 | 5.3796E−04 | −1.8349E−03 | 1.2751E−03 | −6.1426E−04 | 0.0000E+00 | 0.0000E+00 |
| S16 | 4.6505E−04 | −1.7692E−03 | 6.4919E−04 | 7.1369E−04 | −1.2903E−03 | 0.0000E+00 | 0.0000E+00 |

Figure 4A:
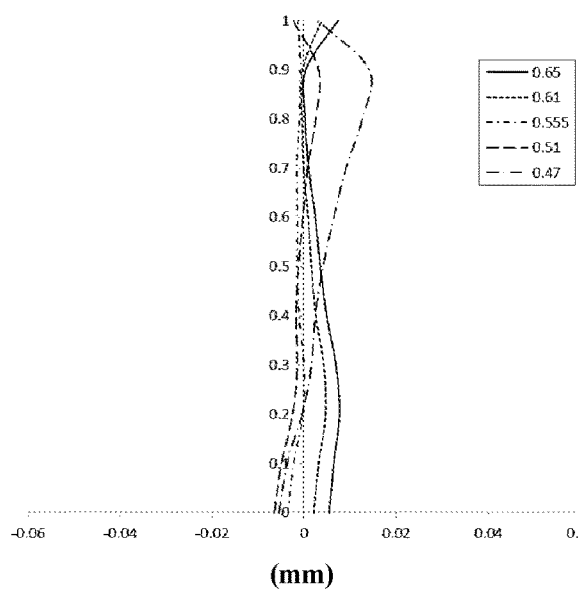
FIGS. 4A to 4D show a longitudinal aberration curve, astigmatism curve, distortion curve and lateral color curve of the optical imaging lens according to Embodiment 2, respectively.
Figure 4B:
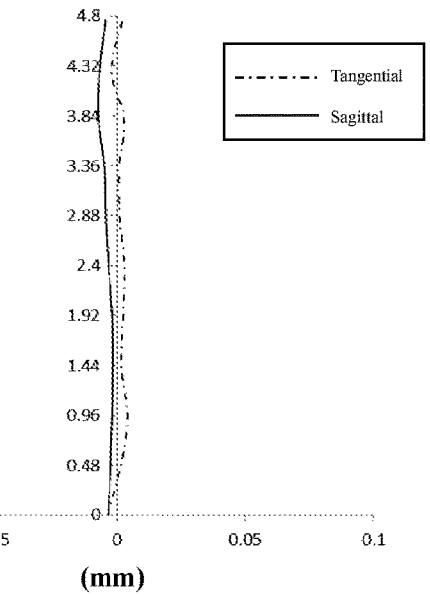
Figure 4C:
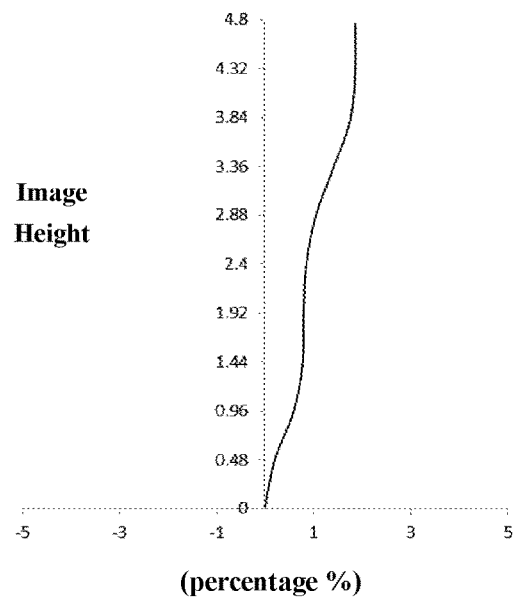
Figure 4D:
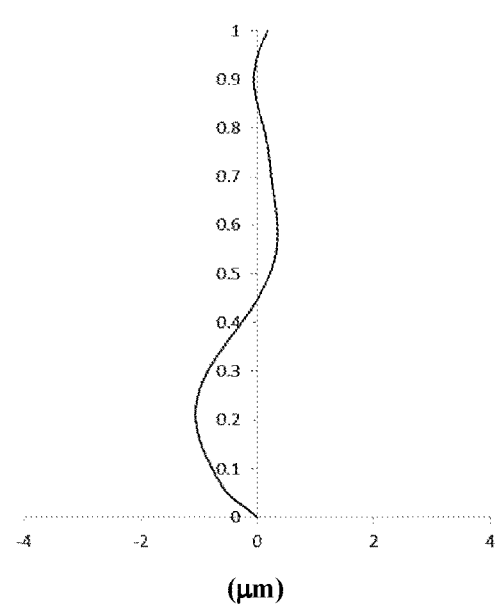

FIG. 4A shows a longitudinal aberration curve of the optical imaging lens according to Embodiment 2, which represents the deviation of the converged focal point after light of different wavelengths passes through the camera lens. FIG. 4B shows an astigmatism curve of the optical imaging lens according to Embodiment 2, which represents the curvature of the tangential image plane and the curvature of the sagittal image plane. FIG. 4C shows a distortion curve of the optical imaging lens according to Embodiment 2, which represents distortion magnitude values corresponding to different image heights. FIG. 4D shows a lateral color curve of the optical imaging lens according to Embodiment 2, which represents the deviation of different image heights on the imaging plane after light passes through the camera lens. According to FIGS. 4A to 4D, it can be seen that the optical imaging lens given in Embodiment 2 can achieve good imaging quality.

Embodiment 3

Figure 5:
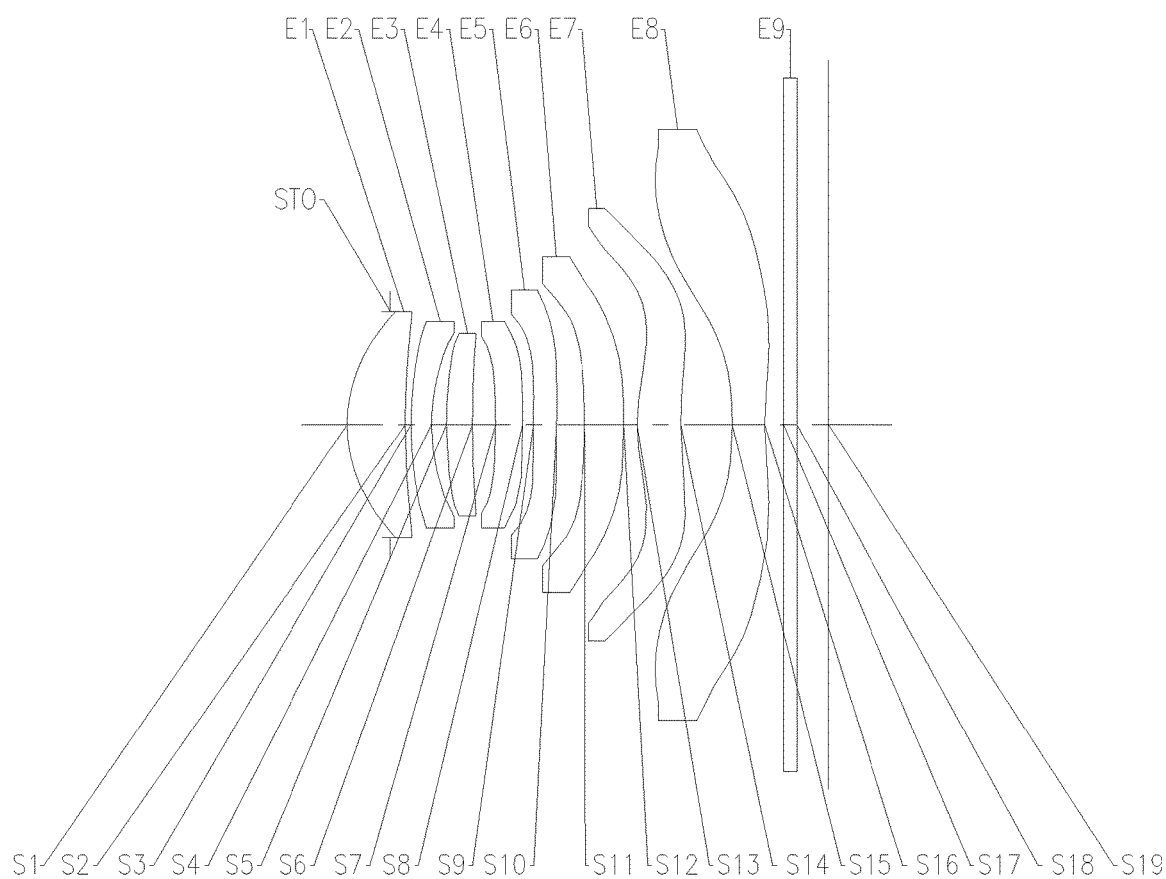
FIG. 5 shows a schematic structural diagram of an optical imaging lens according to Embodiment 3 of the present application.

An optical imaging lens according to Embodiment 3 of the present application will be described below with reference to FIGS. 5 to 6D. FIG. 5 shows a schematic structural diagram of the optical imaging lens according to Embodiment 3 of the present application.

As shown in FIG. 5, the optical imaging lens includes a diaphragm STO, a first lens E1, a second lens E2, a third lens E3, a fourth lens E4, a fifth lens E5, a sixth lens E6, a seventh lens E7, an eighth lens E8 and a filter E9 in order from an object side to an image side along an optical axis.

The first lens E1 has a positive refractive power, and has a convex object side surface S1 and a concave image side surface S2. The second lens E2 has a negative refractive power, and has a convex object side surface S3 and a concave image side surface S4. The third lens E3 has a positive refractive power, and has a convex object side surface S5 and a concave image side surface S6. The fourth lens E4 has a negative refractive power, and has a concave object side surface S7 and a convex image side surface S8. The fifth lens E5 has a negative refractive power, and has a convex object side surface S9 and a concave image side surface S10. The sixth lens E6 has a negative refractive power, and has a concave object side surface S11 and a convex image side surface S12. The seventh lens E7 has a positive refractive power, and has a convex object side surface S13 and a concave image side surface S14. The eighth lens E8 has a negative refractive power, and has a concave object side surface S15 and a concave image side surface S16. The filter E9 has an object side surface S17 and an image side surface S18. The optical imaging lens has an imaging plane S19, and light from an object passes through the respective surfaces S1 to S18 in order and finally forms an image on the imaging plane S19.

In Embodiment 3, a value of a total effective focal length f of the optical imaging lens is 6.65 mm, a value of an on-axis distance TTL between the object side surface S1 of the first lens E1 to the image plane S19 is 7.57 mm, and a value of the maximum field of view FOV is 76.1°.

Table 5 shows a table of basic parameters of the optical imaging lens of Embodiment 3, wherein the units of the radius of curvature, thickness/distance, and focal length are all millimeters (mm). Table 6 shows higher-order coefficients of each aspherical lens surface that are applicable in Embodiment 3, wherein the surface shape of each aspherical surface can be defined by formula (1) given in Embodiment 1 described above.

TABLE 5

| Surface No. | Surface type | Radius of curvature | Thickness/ distance | Material Refractive index | Abbe number | Focal length | Conic coefficient |
|---|---|---|---|---|---|---|---|
| OBJ | Spherical | Infinity | Infinity | | | | |
| STO | Spherical | Infinity | −0.6775 | | | | |
| S1 | Aspherical | 2.4050 | 0.9104 | 1.546 | 56.11 | 5.33 | 0.1641 |
| S2 | Aspherical | 11.9749 | 0.0917 | | | | 6.2846 |
| S3 | Aspherical | 5.3505 | 0.3231 | 1.678 | 19.25 | −12.22 | 1.8726 |
| S4 | Aspherical | 3.1706 | 0.2323 | | | | −0.0059 |
| S5 | Aspherical | 7.3406 | 0.4079 | 1.536 | 55.74 | 23.04 | 12.7900 |
| S6 | Aspherical | 17.7139 | 0.3650 | | | | 29.1959 |
| S7 | Aspherical | −16.4435 | 0.4255 | 1.645 | 23.49 | −34.79 | 0.0000 |
| S8 | Aspherical | −62.2669 | 0.1685 | | | | 99.0000 |
| S9 | Aspherical | 30.0320 | 0.3626 | 1.645 | 23.49 | −336.16 | 19.9174 |
| S10 | Aspherical | 26.2515 | 0.4498 | | | | −99.0000 |
| S11 | Aspherical | −10.8756 | 0.6128 | 1.570 | 37.32 | −25.80 | 1.5250 |
| S12 | Aspherical | −42.5070 | 0.2087 | | | | 99.0000 |
| S13 | Aspherical | 2.7724 | 0.6884 | 1.536 | 55.74 | 7.44 | −0.9147 |
| S14 | Aspherical | 8.2919 | 0.8096 | | | | −1.0678 |
| S15 | Aspherical | −7.1640 | 0.5075 | 1.536 | 55.74 | −5.21 | 0.3098 |
| S16 | Aspherical | 4.6972 | 0.2998 | | | | −1.0963 |

TABLE 5-continued

| | | | | Material | | | |
|---|---|---|---|---|---|---|---|
| Surface No. | Surface type | Radius of curvature | Thickness/ distance | Refractive index | Abbe number | Focal length | Conic coefficient |
| S17 | Spherical | Infinity | 0.2100 | 1.517 | 64.17 | | |
| S18 | Spherical | Infinity | 0.4938 | | | | |
| S19 | Spherical | Infinity | | | | | |

TABLE 6

| Surface No. | A4 | A6 | A8 | A10 | A12 | A14 | A16 |
|---|---|---|---|---|---|---|---|
| S1 | −5.0376E−02 | −1.5510E−02 | −4.9045E−03 | −1.3870E−03 | −3.4761E−04 | −7.1773E−05 | −9.9374E−06 |
| S2 | −2.1891E−02 | 3.2340E−03 | −2.4814E−03 | 4.2703E−04 | −1.9700E−04 | 4.9674E−05 | −1.4129E−05 |
| S3 | −4.9009E−02 | 1.9610E−02 | −1.1526E−03 | 8.3018E−04 | −1.5734E−04 | 6.2066E−05 | −7.7368E−06 |
| S4 | −1.3019E−02 | 1.3034E−02 | 9.7241E−04 | 3.1702E−04 | −1.4740E−04 | −5.3741E−05 | −2.4519E−05 |
| S5 | 1.3538E−02 | 1.0946E−02 | 4.0719E−03 | 8.8849E−04 | 8.6347E−05 | 6.8304E−06 | −3.1870E−06 |
| S6 | −6.0616E−03 | 2.7007E−03 | 1.3292E−03 | 2.9900E−04 | 5.5020E−05 | 1.6212E−05 | 8.5331E−06 |
| S7 | −1.4082E−01 | −9.9854E−03 | −6.5923E−04 | −9.2155E−05 | −5.9580E−06 | −6.7770E−06 | 1.5236E−05 |
| S8 | −2.5305E−01 | −5.5084E−02 | 3.4987E−03 | 1.4793E−03 | 7.3528E−04 | 2.6337E−04 | 1.8924E−04 |
| S9 | −3.2718E−01 | −8.1266E−03 | −2.6574E−03 | −1.1480E−03 | 1.1909E−04 | −6.0582E−05 | 1.6556E−04 |
| S10 | −3.5324E−01 | 2.1902E−02 | −2.1543E−04 | −9.0451E−04 | 4.5756E−04 | −4.0743E−04 | 5.1597E−05 |
| S11 | −3.8656E−01 | −4.6935E−02 | 1.1998E−02 | 8.5038E−03 | 3.6771E−03 | 1.3882E−04 | −2.8493E−04 |
| S12 | −9.2134E−01 | 1.7122E−01 | −2.8363E−02 | 2.2693E−02 | −5.9488E−03 | 9.6619E−04 | −3.0414E−04 |
| S13 | −3.2079E+00 | 4.8840E−01 | −1.3530E−01 | 1.9961E−02 | −2.5409E−02 | −2.1630E−03 | 1.0085E−03 |
| S14 | −2.2807E+00 | 2.2475E−01 | 6.7506E−02 | −3.1413E−02 | 9.7912E−03 | −8.6428E−03 | −2.0439E−04 |
| S15 | −7.8561E−02 | 6.6600E−01 | −3.2365E−01 | 1.2706E−01 | −3.1901E−02 | −1.9341E−03 | 4.8159E−03 |
| S16 | −4.0675E+00 | 8.7691E−01 | −2.5146E−01 | 1.5318E−01 | −5.8302E−02 | 1.3354E−02 | −7.4526E−03 |

| Surface No. | A18 | A20 | A22 | A24 | A26 | A28 | A30 |
|---|---|---|---|---|---|---|---|
| S1 | 2.2652E−06 | 1.7830E−06 | 0.0000E+00 | 0.0000E+00 | 0.0000E+00 | 0.0000E+00 | 0.0000E+00 |
| S2 | 4.8289E−06 | −7.5624E−07 | 0.0000E+00 | 0.0000E+00 | 0.0000E+00 | 0.0000E+00 | 0.0000E+00 |
| S3 | 3.2569E−06 | −5.0399E−08 | 0.0000E+00 | 0.0000E+00 | 0.0000E+00 | 0.0000E+00 | 0.0000E+00 |
| S4 | −6.8587E−06 | −1.2572E−06 | 0.0000E+00 | 0.0000E+00 | 0.0000E+00 | 0.0000E+00 | 0.0000E+00 |
| S5 | −5.0725E−07 | −1.1330E−06 | 0.0000E+00 | 0.0000E+00 | 0.0000E+00 | 0.0000E+00 | 0.0000E+00 |
| S6 | 2.3490E−06 | 1.5979E−06 | 0.0000E+00 | 0.0000E+00 | 0.0000E+00 | 0.0000E+00 | 0.0000E+00 |
| S7 | 2.6741E−06 | 3.6493E−06 | 0.0000E+00 | 0.0000E+00 | 0.0000E+00 | 0.0000E+00 | 0.0000E+00 |
| S8 | 3.8045E−05 | 1.8924E−05 | 0.0000E+00 | 0.0000E+00 | 0.0000E+00 | 0.0000E+00 | 0.0000E+00 |
| S9 | 2.3078E−05 | 1.4327E−05 | 0.0000E+00 | 0.0000E+00 | 0.0000E+00 | 0.0000E+00 | 0.0000E+00 |
| S10 | −8.8147E−05 | 5.6070E−07 | 0.0000E+00 | 0.0000E+00 | 0.0000E+00 | 0.0000E+00 | 0.0000E+00 |
| S11 | −1.6193E−04 | −3.5625E−05 | 0.0000E+00 | 0.0000E+00 | 0.0000E+00 | 0.0000E+00 | 0.0000E+00 |
| S12 | 5.9366E−04 | 5.6300E−05 | 0.0000E+00 | 0.0000E+00 | 0.0000E+00 | 0.0000E+00 | 0.0000E+00 |
| S13 | 1.4602E−03 | −9.2417E−04 | −5.4758E−04 | −2.5811E−04 | 0.0000E+00 | 0.0000E+00 | 0.0000E+00 |
| S14 | −3.6066E−04 | 4.9941E−04 | −5.1005E−04 | −2.3699E−04 | −1.1388E−04 | 0.0000E+00 | 0.0000E+00 |
| S15 | 9.1342E−04 | −3.8309E−03 | 3.3426E−03 | −1.5876E−03 | 4.2876E−04 | −2.6278E−05 | −1.7088E−05 |
| S16 | 4.1691E−03 | −3.0014E−03 | 3.3414E−03 | −1.4233E−03 | 7.7695E−04 | −2.2475E−04 | 1.2068E−04 |

Figure 6A:
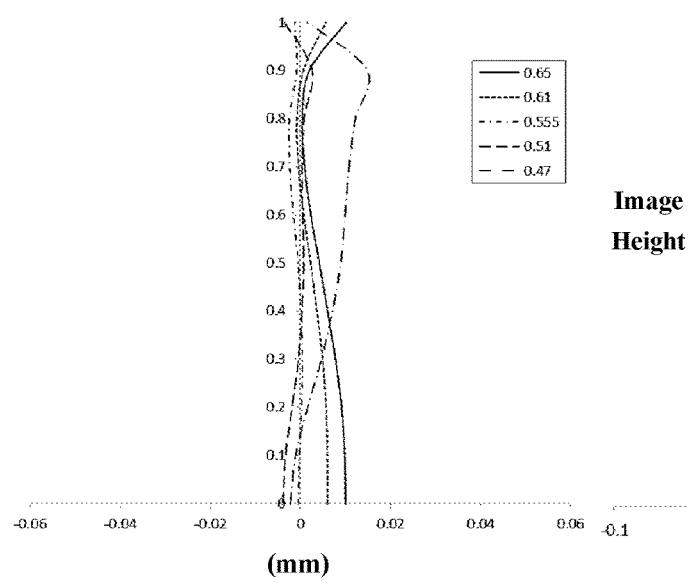
Figure 6B:
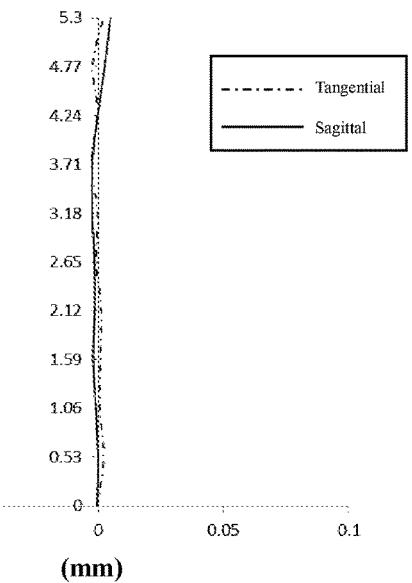

FIG. 6A shows a longitudinal aberration curve of the optical imaging lens according to Embodiment 3, which represents the deviation of the converged focal point after light of different wavelengths passes through the camera lens. FIG. 6B shows an astigmatism curve of the optical imaging lens according to Embodiment 3, which represents the curvature of the tangential image plane and the curvature of the sagittal image plane. FIG. 6C shows a distortion curve of the optical imaging lens according to Embodiment 3, which represents distortion magnitude values corresponding to different image heights. FIG. 6D shows a lateral color curve of the optical imaging lens according to Embodiment 3, which represents the deviation of different image heights on the imaging plane after light passes through the camera lens. According to FIGS. 6A to 6D, it can be seen that the optical imaging lens given in Embodiment 3 can achieve good imaging quality.

Embodiment 4

An optical imaging lens according to Embodiment 4 of the present application will be described below with reference to FIGS. 7 to 8D. FIG. 7 shows a schematic structural diagram of the optical imaging lens according to Embodiment 4 of the present application.

As shown in FIG. 7, the optical imaging lens includes a diaphragm STO, a first lens E1, a second lens E2, a third lens E3, a fourth lens E4, a fifth lens E5, a sixth lens E6, a seventh lens E7, an eighth lens E8 and a filter E9 in order from an object side to an image side along an optical axis.

The first lens E1 has a positive refractive power, and has a convex object side surface S1 and a concave image side surface S2. The second lens E2 has a negative refractive power, and has a convex object side surface S3 and a concave image side surface S4. The third lens E3 has a positive refractive power, and has a convex object side surface S5 and a concave image side surface S6. The fourth lens E4 has a negative refractive power, and has a concave object side surface S7 and a convex image side surface S8. The fifth lens E5 has a positive refractive power, and has a convex object side surface S9 and a concave image side surface S10. The sixth lens E6 has a negative refractive power, and has a concave object side surface S11 and a convex image side surface S12. The seventh lens E7 has a positive refractive power, and has a convex object side surface S13 and a concave image side surface S14. The eighth lens E8 has a negative refractive power, and has a concave object side surface S15 and a concave image side surface S16. The filter E9 has an object side surface S17 and an image side surface S18. The optical imaging lens has an imaging plane S19, and light from an object passes through the respective surfaces S1 to S18 in order and finally forms an image on the imaging plane S19.

In Embodiment 4, a value of a total effective focal length f of the optical imaging lens is 6.65 mm, a value of an on-axis distance TTL between the object side surface S1 of the first lens E1 to the image plane S19 is 7.62 mm, and a value of the maximum field of view FOV is 76.2°.

Table 7 shows a table of basic parameters of the optical imaging lens of Embodiment 4, wherein the units of the radius of curvature, thickness/distance, and focal length are all millimeters (mm). Table 8 shows higher-order coefficients of each aspherical lens surface that are applicable in Embodiment 4, wherein the surface shape of each aspherical surface can be defined by formula (1) given in Embodiment 1 described above.

TABLE 7

| Surface No. | Surface type | Radius of curvature | Thickness/ distance | Material Refractive index | Abbe number | Focal length | Conic coefficient |
|---|---|---|---|---|---|---|---|
| OBJ | Spherical | Infinity | Infinity | | | | |
| STO | Spherical | Infinity | −0.6751 | | | | |
| S1 | Aspherical | 2.4104 | 0.9096 | 1.546 | 56.11 | 5.29 | 0.1652 |
| S2 | Aspherical | 12.6474 | 0.0879 | | | | 6.0378 |
| S3 | Aspherical | 5.4976 | 0.3162 | 1.678 | 19.25 | −11.97 | 1.9211 |
| S4 | Aspherical | 3.2006 | 0.2308 | | | | −0.0042 |
| S5 | Aspherical | 7.4251 | 0.4174 | 1.536 | 55.74 | 23.82 | 12.7423 |
| S6 | Aspherical | 17.3573 | 0.3623 | | | | 26.1302 |
| S7 | Aspherical | −15.9656 | 0.4408 | 1.645 | 23.49 | −26.80 | 0.0000 |
| S8 | Aspherical | −213.0764 | 0.1809 | | | | 99.0000 |
| S9 | Aspherical | 22.5489 | 0.3563 | 1.645 | 23.49 | 73.80 | 39.9237 |
| S10 | Aspherical | 42.6030 | 0.4628 | | | | −99.0000 |
| S11 | Aspherical | −9.0366 | 0.6570 | 1.619 | 25.92 | −24.26 | 0.3895 |
| S12 | Aspherical | −29.1713 | 0.1806 | | | | 99.0000 |
| S13 | Aspherical | 2.8822 | 0.6909 | 1.536 | 55.74 | 7.64 | −0.9080 |
| S14 | Aspherical | 8.8849 | 0.8125 | | | | −1.1669 |
| S15 | Aspherical | −7.2676 | 0.5332 | 1.536 | 55.74 | −5.17 | 0.3196 |
| S16 | Aspherical | 4.6044 | 0.2859 | | | | −1.0494 |
| S17 | Spherical | Infinity | 0.2100 | 1.517 | 64.17 | | |
| S18 | Spherical | Infinity | 0.4800 | | | | |
| S19 | Spherical | Infinity | | | | | |

TABLE 8

| Surface No. | A4 | A6 | A8 | A10 | A12 | A14 | A16 |
|---|---|---|---|---|---|---|---|
| S1 | −5.0004E−02 | −1.5580E−02 | −4.8989E−03 | −1.3822E−03 | −3.3796E−04 | −7.0253E−05 | −7.2013E−06 |
| S2 | −2.2038E−02 | 3.2660E−03 | −2.4906E−03 | 4.5103E−04 | −1.9878E−04 | 5.3033E−05 | −1.4963E−05 |
| S3 | −4.8631E−02 | 1.9464E−02 | −1.3581E−03 | 8.1918E−04 | −1.6442E−04 | 6.7114E−05 | −8.7777E−06 |
| S4 | −1.2946E−02 | 1.2829E−02 | 8.6690E−04 | 2.5863E−04 | −1.6183E−04 | −5.5579E−05 | −2.5455E−05 |
| S5 | 1.3445E−02 | 1.0848E−02 | 4.1239E−03 | 8.5944E−04 | 8.3617E−05 | 6.7796E−06 | −2.7944E−06 |
| S6 | −6.3211E−03 | 2.4734E−03 | 1.3522E−03 | 3.0685E−04 | 6.2479E−05 | 2.0641E−05 | 1.0512E−06 |
| S7 | −1.4074E−01 | −9.6832E−03 | −7.0942E−04 | −9.4249E−05 | −5.2278E−07 | −4.8227E−06 | 1.7530E−05 |
| S8 | −2.5387E−01 | −4.9509E−03 | 3.1482E−03 | 1.3818E−03 | 5.7771E−04 | 2.1615E−04 | 1.5108E−04 |
| S9 | −3.2544E−01 | −9.4091E−03 | −2.3978E−03 | −9.1789E−04 | 5.0221E−06 | −3.5543E−05 | 1.5005E−04 |
| S10 | −3.4460E−01 | 2.3542E−02 | −1.1611E−02 | −1.1918E−03 | 5.3432E−04 | −2.7780E−04 | −2.8484E−06 |
| S11 | −3.8419E−01 | −3.8899E−02 | 1.2362E−02 | 6.9558E−03 | 3.9488E−03 | 1.5511E−04 | −2.1285E−04 |
| S12 | −9.3406E−01 | 1.6819E−01 | −2.8728E−02 | 2.2962E−02 | −4.6864E−03 | 1.0434E−03 | −1.1153E−04 |
| S13 | −3.2028E+00 | 4.8633E−01 | −1.3180E−03 | 1.9654E−02 | −2.7680E−02 | −3.7633E−04 | 1.1646E−03 |
| S14 | −2.2853E+00 | 2.3249E−01 | 6.6542E−02 | −2.6244E−02 | 7.2214E−03 | −7.8653E−03 | −1.5168E−03 |
| S15 | −8.3935E−02 | 6.6553E−01 | −3.2380E−01 | 1.2703E−01 | −3.1796E−02 | −1.9687E−03 | 4.9725E−03 |
| S16 | −4.0474E+00 | 8.7201E−01 | −2.4985E−01 | 1.5025E−01 | −5.9805E−02 | 1.4793E−02 | −7.3996E−03 |

| Surface No. | A18 | A20 | A22 | A24 | A26 | A28 | A30 |
|---|---|---|---|---|---|---|---|
| S1 | 2.3593E−06 | 2.9249E−06 | 0.0000E+00 | 0.0000E+00 | 0.0000E+00 | 0.0000E+00 | 0.0000E+00 |
| S2 | 5.1915E−06 | −5.8085E−07 | 0.0000E+00 | 0.0000E+00 | 0.0000E+00 | 0.0000E+00 | 0.0000E+00 |
| S3 | 3.9224E−06 | −8.3402E−08 | 0.0000E+00 | 0.0000E+00 | 0.0000E+00 | 0.0000E+00 | 0.0000E+00 |
| S4 | −7.2072E−06 | −1.5326E−06 | 0.0000E+00 | 0.0000E+00 | 0.0000E+00 | 0.0000E+00 | 0.0000E+00 |
| S5 | −1.1273E−06 | −1.1337E−06 | 0.0000E+00 | 0.0000E+00 | 0.0000E+00 | 0.0000E+00 | 0.0000E+00 |
| S6 | 3.3736E−06 | 1.7547E−06 | 0.0000E+00 | 0.0000E+00 | 0.0000E+00 | 0.0000E+00 | 0.0000E+00 |
| S7 | 1.2307E−06 | 4.5227E−06 | 0.0000E+00 | 0.0000E+00 | 0.0000E+00 | 0.0000E+00 | 0.0000E+00 |
| S8 | 2.3077E−05 | 1.3936E−05 | 0.0000E+00 | 0.0000E+00 | 0.0000E+00 | 0.0000E+00 | 0.0000E+00 |
| S9 | 1.2458E−05 | 1.1033E−05 | 0.0000E+00 | 0.0000E+00 | 0.0000E+00 | 0.0000E+00 | 0.0000E+00 |
| S10 | −1.2107E−04 | 1.2068E−05 | 0.0000E+00 | 0.0000E+00 | 0.0000E+00 | 0.0000E+00 | 0.0000E+00 |

TABLE 8-continued

| | | | | | | | |
|---|---|---|---|---|---|---|---|
| S11 | −2.2377E−04 | −2.3040E−06 | 0.0000E+00 | 0.0000E+00 | 0.0000E+00 | 0.0000E+00 | 0.0000E+00 |
| S12 | 6.7750E−04 | 4.4335E−04 | 0.0000E+00 | 0.0000E+00 | 0.0000E+00 | 0.0000E+00 | 0.0000E+00 |
| S13 | 1.1336E−03 | −8.2049E−04 | −9.8673E−04 | −2.4372E−04 | 0.0000E+00 | 0.0000E+00 | 0.0000E+00 |
| S14 | −9.9743E−04 | 9.1111E−04 | −5.0349E−04 | −1.3491E−04 | −9.9782E−05 | 0.0000E+00 | 0.0000E+00 |
| S15 | 7.5827E−04 | −3.8705E−03 | 3.3067E−03 | −1.4501E−03 | 2.9645E−04 | 2.4977E−05 | −2.1803E−05 |
| S16 | 4.8398E−03 | −3.3330E−03 | 3.1371E−03 | −1.5826E−03 | 7.4849E−04 | −1.3488E−04 | 1.2009E−04 |

Figure 8A:
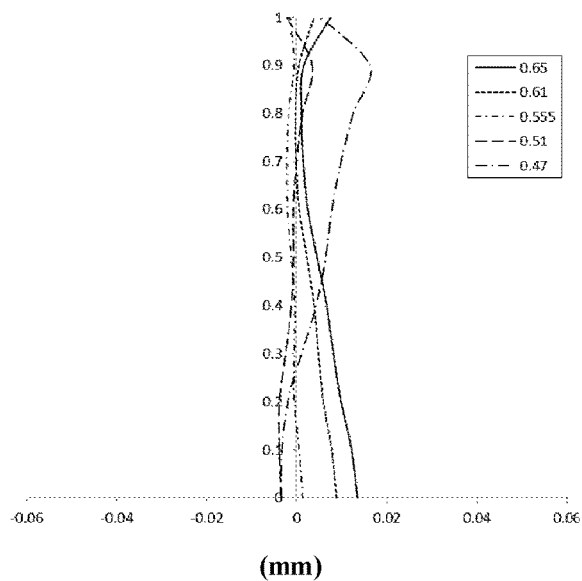
FIGS. 8A to 8D show a longitudinal aberration curve, astigmatism curve, distortion curve and lateral color curve of the optical imaging lens according to Embodiment 4, respectively.
Figure 8B:
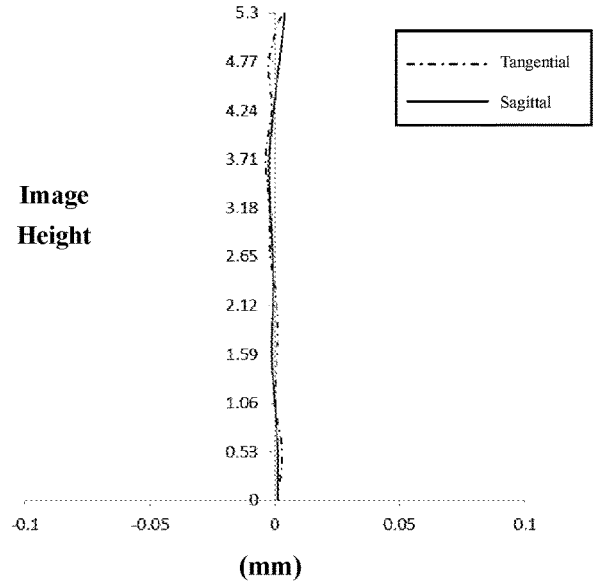
Figure 8C:
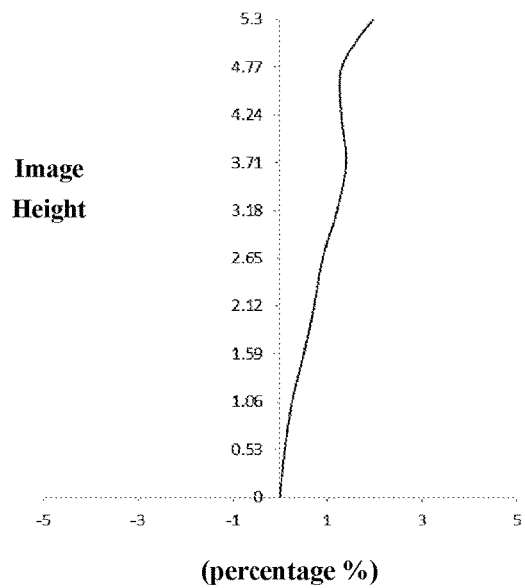
Figure 8D:
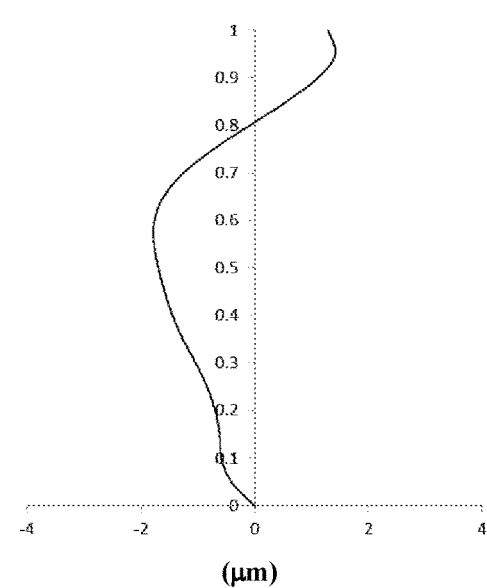

FIG. 8A shows a longitudinal aberration curve of the optical imaging lens according to Embodiment 4, which represents the deviation of the converged focal point after light of different wavelengths passes through the camera lens. FIG. 8B shows an astigmatism curve of the optical imaging lens according to Embodiment 4, which represents the curvature of the tangential image plane and the curvature of the sagittal image plane. FIG. 8C shows a distortion curve of the optical imaging lens according to Embodiment 4, which represents distortion magnitude values corresponding to different image heights. FIG. 8D shows a lateral color curve of the optical imaging lens according to Embodiment 4, which represents the deviation of different image heights on the imaging plane after light passes through the camera lens. According to FIGS. 8A to 8D, it can be seen that the optical imaging lens given in Embodiment 4 can achieve good imaging quality.

Embodiment 5

Figure 9:
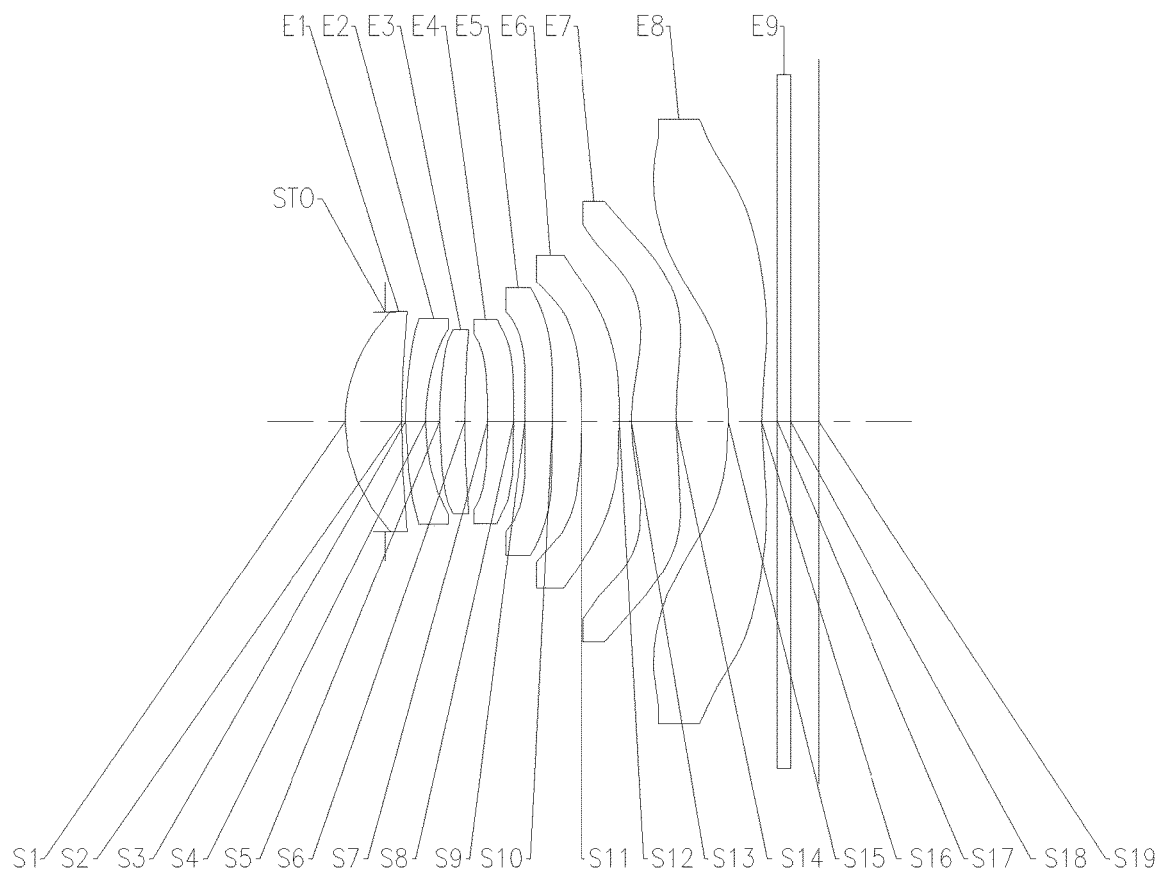
FIG. 9 shows a schematic structural diagram of an optical imaging lens according to Embodiment 5 of the present application.

An optical imaging lens according to Embodiment 5 of the present application will be described below with reference to FIGS. 9 to 10D. FIG. 9 shows a schematic structural diagram of the optical imaging lens according to Embodiment 5 of the present application.

As shown in FIG. 9, the optical imaging lens includes a diaphragm STO, a first lens E1, a second lens E2, a third lens E3, a fourth lens E4, a fifth lens E5, a sixth lens E6, a seventh lens E7, an eighth lens E8 and a filter E9 in order from an object side to an image side along an optical axis.

The first lens E1 has a positive refractive power, and has a convex object side surface S1 and a concave image side surface S2. The second lens E2 has a negative refractive power, and has a convex object side surface S3 and a concave image side surface S4. The third lens E3 has a positive refractive power, and has a convex object side surface S5 and a concave image side surface S6. The fourth lens E4 has a negative focal power, and has a concave object side surface S7 and a concave image side surface S8. The fifth lens E5 has a positive refractive power, and has a convex object side surface S9 and a concave image side surface S10. The sixth lens E6 has a negative refractive power, and has a concave object side surface S11 and a convex image side surface S12. The seventh lens E7 has a positive refractive power, and has a convex object side surface S13 and a concave image side surface S14. The eighth lens E8 has a negative refractive power, and has a concave object side surface S15 and a concave image side surface S16. The filter E9 has an object side surface S17 and an image side surface S18. The optical imaging lens has an imaging plane S19, and light from an object passes through the respective surfaces S1 to S18 in order and finally forms an image on the imaging plane S19.

In Embodiment 5, a value of a total effective focal length f of the optical imaging lens is 6.47 mm, a value of an on-axis distance TTL between the object side surface S1 of the first lens E1 to the image plane S19 is 7.50 mm, and a value of the maximum field of view FOV is 77.5°.

Table 9 shows a table of basic parameters of the optical imaging lens of Embodiment 5, wherein the units of the radius of curvature, thickness/distance, and focal length are all millimeters (mm). Table 10 shows higher-order coefficients of each aspherical lens surface that are applicable in Embodiment 5, wherein the surface shape of each aspherical surface can be defined by formula (1) given in Embodiment 1 described above.

TABLE 9

| | | | | Material | | | |
|---|---|---|---|---|---|---|---|
| Surface No. | Surface type | Radius of curvature | Thickness/ distance | Refractive index | Abbe number | Focal length | Conic coefficient |
| OBJ | Spherical | Infinity | Infinity | | | | |
| STO | Spherical | Infinity | −0.6313 | | | | |
| S1 | Aspherical | 2.4208 | 0.8957 | 1.546 | 56.11 | 5.23 | 0.1686 |
| S2 | Aspherical | 13.8929 | 0.0602 | | | | 7.2067 |
| S3 | Aspherical | 5.7409 | 0.3160 | 1.678 | 19.25 | −11.36 | 1.5325 |
| S4 | Aspherical | 3.2149 | 0.2207 | | | | 0.0465 |
| S5 | Aspherical | 7.3003 | 0.3991 | 1.536 | 55.74 | 24.47 | 12.9272 |
| S6 | Aspherical | 16.1222 | 0.3628 | | | | 12.8688 |
| S7 | Aspherical | −18.4393 | 0.4113 | 1.546 | 56.11 | −32.54 | 0.0000 |
| S8 | Aspherical | 489.7077 | 0.1769 | | | | −99.0000 |
| S9 | Aspherical | 20.8009 | 0.4355 | 1.645 | 23.49 | 75.53 | 85.8881 |
| S10 | Aspherical | 36.0198 | 0.4645 | | | | −98.9988 |
| S11 | Aspherical | −10.0941 | 0.6000 | 1.546 | 56.11 | −25.50 | 4.4825 |
| S12 | Aspherical | −37.5054 | 0.1911 | | | | 99.0000 |
| S13 | Aspherical | 2.8048 | 0.7067 | 1.536 | 55.74 | 7.71 | −0.9176 |
| S14 | Aspherical | 7.9454 | 0.8261 | | | | 0.1627 |
| S15 | Aspherical | −7.3718 | 0.5263 | 1.536 | 55.74 | −5.05 | 0.3556 |
| S16 | Aspherical | 4.3993 | 0.2515 | | | | −1.1445 |
| S17 | Spherical | Infinity | 0.2100 | 1.517 | 64.17 | | |
| S18 | Spherical | Infinity | 0.4455 | | | | |
| S19 | Spherical | Infinity | | | | | |

TABLE 10

| Surface No. | A4 | A6 | A8 | A10 | A12 | A14 | A16 |
|---|---|---|---|---|---|---|---|
| S1 | −4.7163E−02 | −1.6695E−02 | −5.7036E−03 | −1.6407E−03 | −3.6998E−04 | −3.2432E−05 | 1.9136E−05 |
| S2 | −2.1459E−02 | 2.4669E−03 | −2.6139E−03 | 5.7094E−04 | −1.7267E−04 | 7.7875E−05 | −1.8862E−05 |
| S3 | −5.0989E−02 | 1.8992E−02 | −1.0972E−03 | 9.9399E−04 | −8.1469E−05 | 7.1148E−05 | −2.6257E−05 |
| S4 | −1.1958E−02 | 1.2988E−02 | 9.5408E−04 | 1.1677E−05 | −1.7190E−04 | −4.8694E−05 | −1.7776E−05 |
| S5 | 1.3342E−02 | 1.2164E−02 | 4.1293E−03 | 5.3033E−04 | 7.8543E−06 | 1.5581E−05 | 1.2358E−05 |
| S6 | −8.0261E−03 | 2.6764E−03 | 1.3029E−03 | 1.3267E−04 | −1.6503E−05 | −4.3956E−06 | 3.1521E−06 |
| S7 | −1.4181E−01 | −1.1227E−02 | −9.3808E−04 | −2.8592E−04 | −1.3260E−04 | −4.7241E−05 | −6.9339E−07 |
| S8 | −2.5518E−01 | −4.8331E−03 | 3.4038E−03 | 1.4039E−03 | 4.8765E−04 | 2.4433E−04 | 1.9971E−04 |
| S9 | −3.2228E−01 | −7.3896E−03 | −2.8518E−03 | −1.1162E−03 | −4.2895E−04 | −2.1108E−04 | 9.3186E−05 |
| S10 | −3.6765E−01 | 2.0137E−02 | 6.6079E−04 | −8.4532E−04 | 1.8720E−05 | −3.2702E−04 | 5.2459E−05 |
| S11 | −4.0104E−01 | −4.7538E−02 | 1.1519E−02 | 6.6793E−03 | 4.0233E−03 | 4.4772E−04 | −6.7161E−05 |
| S12 | −9.2948E−01 | 1.6914E−01 | −2.9393E−02 | 2.0985E−02 | −5.0295E−03 | 1.5719E−03 | −9.3329E−05 |
| S13 | −3.2094E+00 | 4.8215E−01 | 2.0055E−04 | 1.8185E−02 | −2.9573E−02 | −1.9474E−03 | 1.9223E−03 |
| S14 | −2.2302E+00 | 2.3348E−01 | 5.6725E−02 | −2.8802E−02 | 8.7689E−03 | −8.7561E−03 | −6.6182E−04 |
| S15 | −5.5942E−02 | 6.6193E−01 | −3.2503E−01 | 1.2657E−01 | −3.1806E−02 | −1.9344E−03 | 4.9630E−03 |
| S16 | −4.1034E+00 | 8.6325E−01 | −2.5668E−01 | 1.5300E−01 | −5.9124E−02 | 1.4595E−02 | −7.9093E−03 |

| Surface No. | A18 | A20 | A22 | A24 | A26 | A28 | A30 |
|---|---|---|---|---|---|---|---|
| S1 | 1.7307E−05 | 5.5559E−06 | 0.0000E+00 | 0.0000E+00 | 0.0000E+00 | 0.0000E+00 | 0.0000E+00 |
| S2 | 6.2293E−06 | −3.6596E−06 | 0.0000E+00 | 0.0000E+00 | 0.0000E+00 | 0.0000E+00 | 0.0000E+00 |
| S3 | −1.4835E−06 | −3.7507E−06 | 0.0000E+00 | 0.0000E+00 | 0.0000E+00 | 0.0000E+00 | 0.0000E+00 |
| S4 | −5.0214E−06 | −1.8953E−06 | 0.0000E+00 | 0.0000E+00 | 0.0000E+00 | 0.0000E+00 | 0.0000E+00 |
| S5 | 5.2364E−06 | 8.9036E−07 | 0.0000E+00 | 0.0000E+00 | 0.0000E+00 | 0.0000E+00 | 0.0000E+00 |
| S6 | 1.0377E−06 | 1.2423E−06 | 0.0000E+00 | 0.0000E+00 | 0.0000E+00 | 0.0000E+00 | 0.0000E+00 |
| S7 | −1.1496E−06 | 2.0687E−06 | 0.0000E+00 | 0.0000E+00 | 0.0000E+00 | 0.0000E+00 | 0.0000E+00 |
| S8 | 4.5989E−05 | 2.7416E−05 | 0.0000E+00 | 0.0000E+00 | 0.0000E+00 | 0.0000E+00 | 0.0000E+00 |
| S9 | −9.0489E−06 | 1.0736E−05 | 0.0000E+00 | 0.0000E+00 | 0.0000E+00 | 0.0000E+00 | 0.0000E+00 |
| S10 | −8.7328E−05 | 8.8999E−06 | 0.0000E+00 | 0.0000E+00 | 0.0000E+00 | 0.0000E+00 | 0.0000E+00 |
| S11 | −1.8819E−04 | −3.9936E−05 | 0.0000E+00 | 0.0000E+00 | 0.0000E+00 | 0.0000E+00 | 0.0000E+00 |
| S12 | 6.2199E−04 | 1.2417E−04 | 0.0000E+00 | 0.0000E+00 | 0.0000E+00 | 0.0000E+00 | 0.0000E+00 |
| S13 | 2.1689E−03 | −1.3375E−03 | −1.0693E−03 | −4.0875E−04 | 0.0000E+00 | 0.0000E+00 | 0.0000E+00 |
| S14 | 3.0080E−04 | 9.4696E−04 | −3.1200E−04 | −1.0240E−04 | −7.7216E−05 | 0.0000E+00 | 0.0000E+00 |
| S15 | 7.1645E−04 | −3.9127E−03 | 3.2869E−03 | −1.4602E−03 | 2.9253E−04 | 2.7327E−05 | −1.7321E−05 |
| S16 | 4.3402E−03 | −3.4835E−03 | 3.0826E−03 | −1.6407E−03 | 6.9658E−04 | −3.0461E−04 | 8.3254E−05 |

Figure 10A:
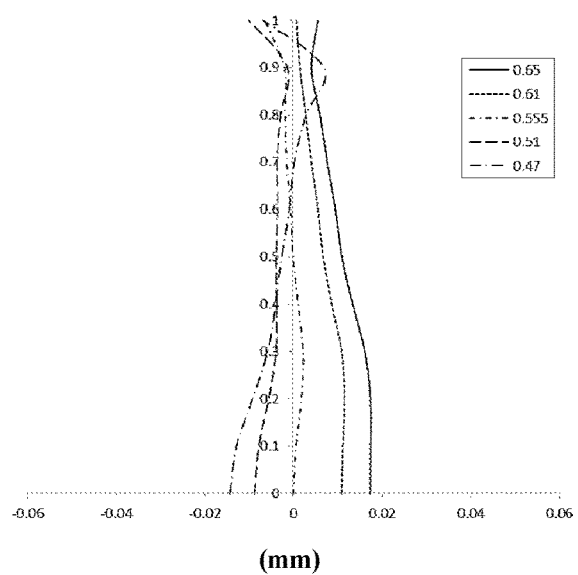
Figure 10B:
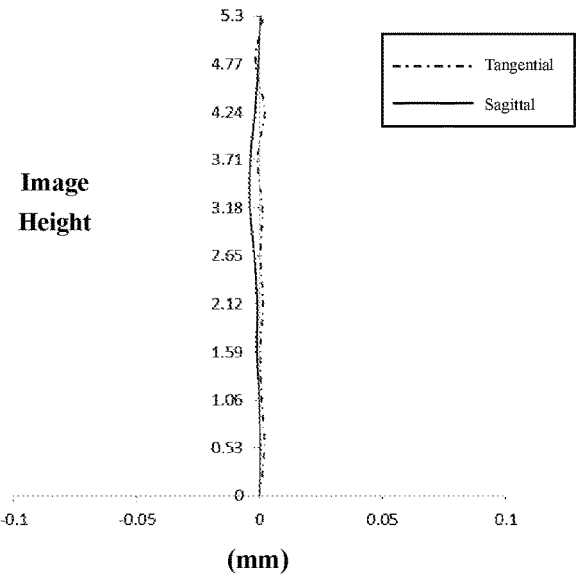

FIG. 10A shows a longitudinal aberration curve of the optical imaging lens according to Embodiment 5, which represents the deviation of the converged focal point after light of different wavelengths passes through the camera lens. FIG. 10B shows an astigmatism curve of the optical imaging lens according to Embodiment 5, which represents the curvature of the tangential image plane and the curvature of the sagittal image plane. FIG. 10C shows a distortion curve of the optical imaging lens according to Embodiment 5, which represents distortion magnitude values corresponding to different image heights. FIG. 10D shows a lateral color curve of the optical imaging lens according to Embodiment 5, which represents the deviation of different image heights on the imaging plane after light passes through the camera lens. According to FIGS. 10A to 10D, it can be seen that the optical imaging lens given in Embodiment 5 can achieve good quality of imaging.

Embodiment 6

An optical imaging lens according to Embodiment 6 of the present application will be described below with reference to FIGS. 11 to 12D. FIG. 11 shows a schematic structural diagram of the optical imaging lens according to Embodiment 6 of the present application.

As shown in FIG. 11, the optical imaging lens includes a diaphragm STO, a first lens E1, a second lens E2, a third lens E3, a fourth lens E4, a fifth lens E5, a sixth lens E6, a seventh lens E7, an eighth lens E8 and a filter E9 in order from an object side to an image side along an optical axis.

The first lens E1 has a positive refractive power, and has a convex object side surface S1 and a concave image side surface S2. The second lens E2 has a negative refractive power, and has a convex object side surface S3 and a concave image side surface S4. The third lens E3 has a positive refractive power, and has a convex object side surface S5 and a concave image side surface S6. The fourth lens E4 has a positive refractive power, and has a concave object side surface S7 and a convex image side surface S8. The fifth lens E5 has a positive refractive power, and has a convex object side surface S9 and a concave image side surface S10. The sixth lens E6 has a negative refractive power, and has a concave object side surface S11 and a concave image side surface S12. The seventh lens E7 has a positive refractive power, and has a convex object side surface S13 and a convex image side surface S14. The eighth lens E8 has a negative refractive power, and has a concave object side surface S15 and a convex image side surface S16. The filter E9 has an object side surface S17 and an image side surface S18. The optical imaging lens has an imaging plane S19, and light from an object passes through the respective surfaces S1 to S18 in order and finally forms an image on the imaging plane S19.

In Embodiment 6, a value of a total effective focal length f of the optical imaging lens is 6.29 mm, a value of an on-axis distance TTL between the object side surface S1 of the first lens E1 to the image plane S19 is 7.42 mm, and a value of the maximum field of view FOV is 83.6°.

Table 11 shows a table of basic parameters of the optical imaging lens of Embodiment 6, wherein the units of the radius of curvature, thickness/distance, and focal length are all millimeters (mm). Table 12 shows higher-order coefficients of each aspherical lens surface that are applicable in Embodiment 6, wherein the surface shape of each aspherical surface can be defined by formula (1) given in Embodiment 1 described above.

TABLE 11

| Surface No. | Surface type | Radius of curvature | Thickness/ distance | Material Refractive index | Abbe number | Focal length | Conic coefficient |
|---|---|---|---|---|---|---|---|
| OBJ | Spherical | Infinity | Infinity | | | | |
| STO | Spherical | Infinity | −0.6517 | | | | |
| S1 | Aspherical | 2.4695 | 0.8578 | 1.543 | 53.64 | 5.12 | 0.1414 |
| S2 | Aspherical | 18.7047 | 0.0858 | | | | 12.4384 |
| S3 | Aspherical | 6.3433 | 0.2500 | 1.673 | 19.48 | −10.59 | 2.1398 |
| S4 | Aspherical | 3.3163 | 0.2359 | | | | 0.1860 |
| S5 | Aspherical | 7.8265 | 0.3568 | 1.552 | 49.70 | 52.12 | 10.9363 |
| S6 | Aspherical | 10.5660 | 0.3701 | | | | 12.9579 |
| S7 | Aspherical | −42.9534 | 0.4333 | 1.597 | 30.73 | 46.80 | 0.0000 |
| S8 | Aspherical | −17.0478 | 0.3605 | | | | 97.2622 |
| S9 | Aspherical | 20.1683 | 0.2511 | 1.615 | 25.52 | 1000.00 | −46.8164 |
| S10 | Aspherical | 20.7479 | 0.4671 | | | | −98.9988 |
| S11 | Aspherical | −9.4455 | 0.4806 | 1.566 | 40.98 | −13.67 | 3.0080 |
| S12 | Aspherical | 44.8171 | 0.2316 | | | | −98.9999 |
| S13 | Aspherical | 2.7896 | 0.8606 | 1.544 | 55.99 | 6.81 | −0.8796 |
| S14 | Aspherical | −6.5213 | 0.9964 | | | | 0.0000 |
| S15 | Aspherical | −7.1695 | 0.4308 | 1.539 | 53.69 | −4.86 | 0.2815 |
| S16 | Aspherical | −11.9340 | 0.1672 | | | | 0.0000 |
| S17 | Spherical | Infinity | 0.2163 | 1.517 | 64.17 | | |
| S18 | Spherical | Infinity | 0.3670 | | | | |
| S19 | Spherical | Infinity | | | | | |

TABLE 12

| Surface No. | A4 | A6 | A8 | A10 | A12 | A14 | A16 |
|---|---|---|---|---|---|---|---|
| S1 | −5.5171E−02 | −1.8263E−02 | −5.8135E−03 | −1.6634E−03 | −5.1347E−04 | −1.3134E−04 | −5.0361E−05 |
| S2 | −2.1581E−02 | 1.3407E−03 | −2.1563E−03 | 9.5172E−05 | −1.4458E−04 | 5.7071E−06 | −1.0564E−05 |
| S3 | −4.8213E−02 | 1.8188E−02 | −2.6466E−03 | 5.1345E−04 | 1.5178E−05 | 7.2718E−05 | 1.4972E−05 |
| S4 | −9.2286E−03 | 1.1823E−02 | −2.0088E−04 | −2.3508E−04 | −3.0479E−04 | −1.4555E−04 | −3.6576E−05 |
| S5 | 1.2225E−02 | 1.3236E−02 | 4.6833E−03 | 5.4825E−04 | −8.3304E−05 | −1.4864E−04 | −4.2018E−05 |
| S6 | −1.0346E−02 | 4.6664E−03 | 1.7596E−03 | 3.8285E−04 | 7.1276E−05 | 1.4335E−05 | −8.7483E−06 |
| S7 | −1.4908E−01 | −1.0148E−02 | −1.3370E−03 | 1.1908E−05 | −1.1247E−04 | 1.1433E−05 | −2.6644E−05 |
| S8 | −2.6427E−01 | −8.6283E−03 | 9.5588E−04 | 8.7534E−04 | 3.4429E−04 | 2.2209E−04 | 1.3594E−04 |
| S9 | −3.4481E−01 | −6.3319E−03 | −6.2253E−04 | −1.4020E−03 | −3.3536E−04 | −2.1489E−04 | 2.0121E−05 |
| S10 | −3.7127E−01 | 1.5833E−02 | 2.6168E−03 | −2.8287E−03 | 5.4379E−04 | −2.7377E−04 | 1.3044E−04 |
| S11 | −3.6711E−01 | −7.2422E−02 | 8.0304E−03 | 5.9648E−03 | 3.3965E−03 | 6.6012E−04 | 3.4203E−04 |
| S12 | −1.1446E+00 | 1.4172E−01 | −2.3286E−02 | 1.5468E−02 | −4.4682E−03 | 3.1309E−03 | 1.1625E−03 |
| S13 | −3.2634E+00 | 4.5375E−01 | −1.1339E−01 | 2.1678E−04 | −2.3808E−02 | 3.3859E−03 | 1.6715E−03 |
| S14 | 7.4884E−01 | 4.9297E−01 | 4.3716E−02 | −1.1758E−01 | 5.8516E−02 | −5.2472E−02 | 3.0819E−03 |
| S15 | −8.5929E−02 | 6.7720E−01 | −3.3673E−01 | 1.3210E−01 | −3.1308E−02 | −2.5262E−03 | 3.9386E−03 |
| S16 | 1.0815E+00 | 1.6671E−01 | 8.6987E−03 | 1.2555E−01 | 1.4087E−01 | 6.2523E−02 | −2.9401E−02 |

| Surface No. | A18 | A20 | A22 | A24 | A26 | A28 | A30 |
|---|---|---|---|---|---|---|---|
| S1 | −9.7503E−06 | −4.8972E−06 | 0.0000E+00 | 0.0000E+00 | 0.0000E+00 | 0.0000E+00 | 0.0000E+00 |
| S2 | 5.8706E−06 | −5.8403E−06 | 0.0000E+00 | 0.0000E+00 | 0.0000E+00 | 0.0000E+00 | 0.0000E+00 |
| S3 | −1.1588E−05 | −1.6884E−05 | 0.0000E+00 | 0.0000E+00 | 0.0000E+00 | 0.0000E+00 | 0.0000E+00 |
| S4 | 5.5536E−06 | −4.4358E−07 | 0.0000E+00 | 0.0000E+00 | 0.0000E+00 | 0.0000E+00 | 0.0000E+00 |
| S5 | −1.2670E−05 | 8.1003E−06 | 0.0000E+00 | 0.0000E+00 | 0.0000E+00 | 0.0000E+00 | 0.0000E+00 |
| S6 | −9.7917E−07 | −1.1739E−06 | 0.0000E+00 | 0.0000E+00 | 0.0000E+00 | 0.0000E+00 | 0.0000E+00 |
| S7 | 6.4373E−07 | −1.4340E−05 | 0.0000E+00 | 0.0000E+00 | 0.0000E+00 | 0.0000E+00 | 0.0000E+00 |
| S8 | 5.1107E−05 | 3.0895E−05 | 0.0000E+00 | 0.0000E+00 | 0.0000E+00 | 0.0000E+00 | 0.0000E+00 |
| S9 | −1.4161E−05 | −7.8888E−06 | 0.0000E+00 | 0.0000E+00 | 0.0000E+00 | 0.0000E+00 | 0.0000E+00 |
| S10 | −8.3588E−05 | 2.5379E−05 | 0.0000E+00 | 0.0000E+00 | 0.0000E+00 | 0.0000E+00 | 0.0000E+00 |
| S11 | −1.3480E−05 | −6.9694E−05 | 0.0000E+00 | 0.0000E+00 | 0.0000E+00 | 0.0000E+00 | 0.0000E+00 |
| S12 | 3.5958E−04 | −1.7693E−04 | 0.0000E+00 | 0.0000E+00 | 0.0000E+00 | 0.0000E+00 | 0.0000E+00 |
| S13 | 9.9833E−04 | −9.1905E−05 | 7.8887E−05 | −8.4722E−05 | 0.0000E+00 | 0.0000E+00 | 0.0000E+00 |
| S14 | 1.0869E−02 | −1.0686E−02 | 9.2311E−04 | 2.5522E−04 | −3.7675E−04 | −2.4322E−05 | −3.0200E−04 |
| S15 | 8.4919E−04 | −3.5372E−04 | 2.9675E−03 | −1.3743E−03 | 3.5103E−04 | −2.7111E−06 | −1.4883E−05 |
| S16 | 4.0602E−02 | −4.9967E−02 | 4.5202E−02 | −7.6782E−03 | 1.8682E−02 | −4.2597E−03 | 2.2063E−03 |

Figure 12A:
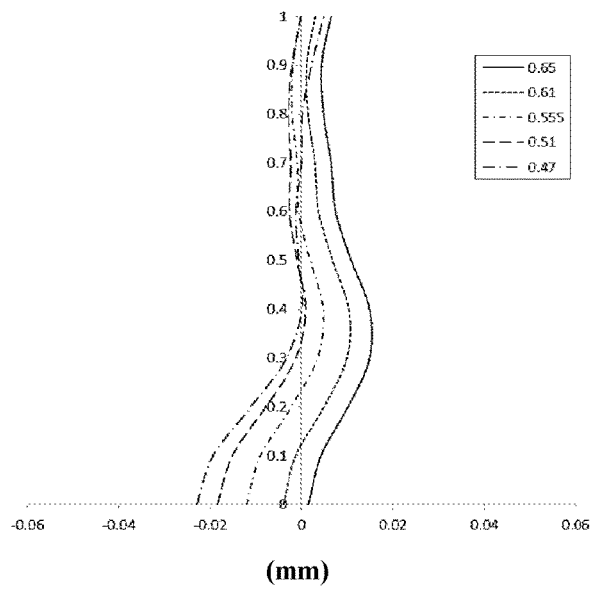
FIGS. 12A to 12D show a longitudinal aberration curve, astigmatism curve, distortion curve and lateral color curve of the optical imaging lens according to Embodiment 6, respectively.
Figure 12B:
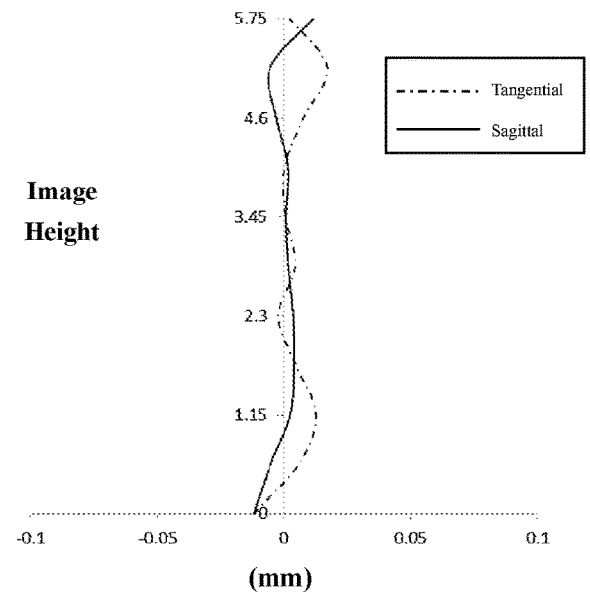
Figure 12C:
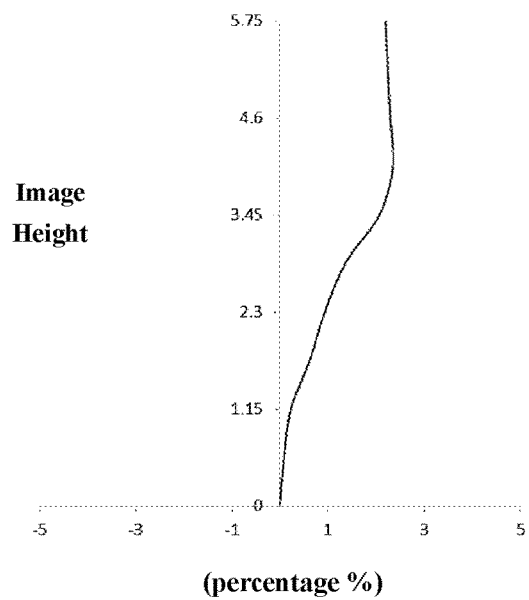
Figure 12D:
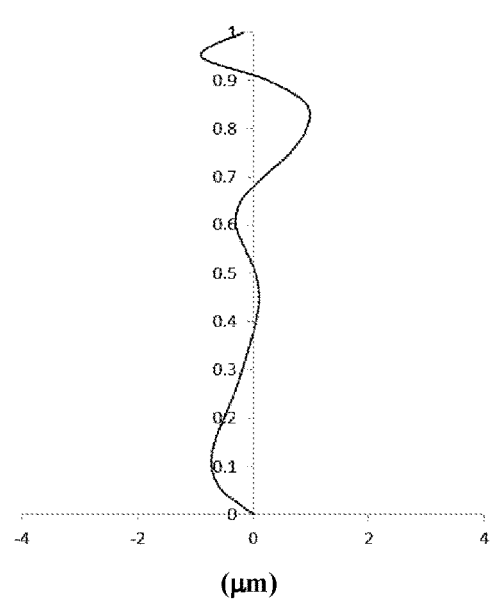

FIG. 12A shows a longitudinal aberration curve of the optical imaging lens according to Embodiment 6, which represents the deviation of the converged focal point after light of different wavelengths passes through the camera lens. FIG. 12B shows an astigmatism curve of the optical imaging lens according to Embodiment 6, which represents the curvature of the tangential image plane and the curvature of the sagittal image plane. FIG. 12C shows a distortion curve of the optical imaging lens according to Embodiment 6, which represents distortion magnitude values corresponding to different image heights. FIG. 12D shows a lateral color curve of the optical imaging lens according to Embodiment 6, which represents the deviation of different image heights on the imaging plane after light passes through the camera lens. According to FIGS. 12A to 12D, it can be seen that the optical imaging lens given in Embodiment 6 can achieve good imaging quality.

Embodiment 7

Figure 13:
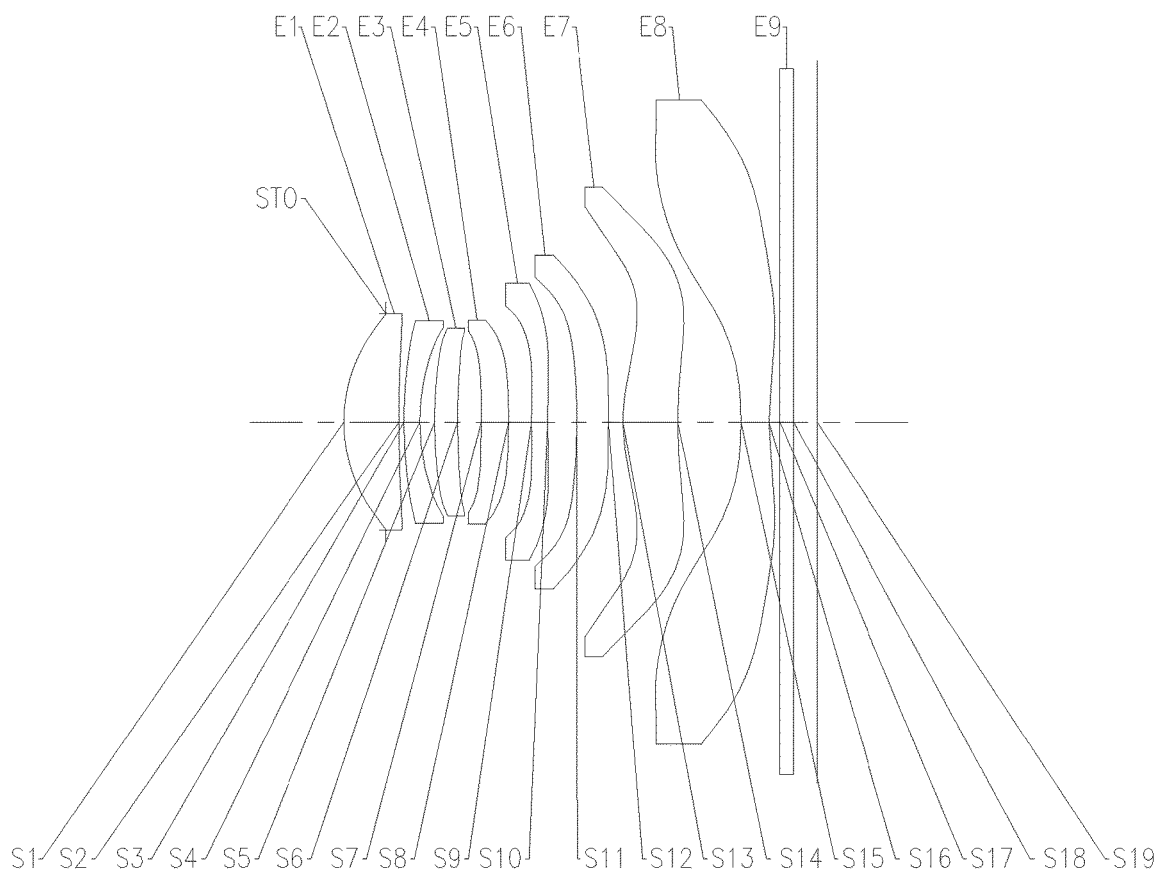
FIG. 13 shows a schematic structural diagram of an optical imaging lens according to Embodiment 7 of the present application.

An optical imaging lens according to Embodiment 7 of the present application will be described below with reference to FIGS. 13 to 14D. FIG. 13 shows a schematic structural diagram of the optical imaging lens according to Embodiment 7 of the present application.

As shown in FIG. 13, the optical imaging lens includes a diaphragm STO, a first lens E1, a second lens E2, a third lens E3, a fourth lens E4, a fifth lens E5, a sixth lens E6, a seventh lens E7, an eighth lens E8 and a filter E9 in order from an object side to an image side along an optical axis.

The first lens E1 has a positive refractive power, and has a convex object side surface S1 and a concave image side surface S2. The second lens E2 has a negative refractive power, and has a convex object side surface S3 and a concave image side surface S4. The third lens E3 has a positive refractive power, and has a convex object side surface S5 and a concave image side surface S6. The fourth lens E4 has a positive refractive power, and has a concave object side surface S7 and a convex image side surface S8. The fifth lens E5 has a negative refractive power, and has a convex object side surface S9 and a concave image side surface S10. The sixth lens E6 has a negative refractive power, and has a concave object side surface S11 and a concave image side surface S12. The seventh lens E7 has a positive refractive power, and has a convex object side surface S13 and a convex image side surface S14. The eighth lens E8 has a negative refractive power, and has a concave object side surface S15 and a convex image side surface S16. The filter E9 has an object side surface S17 and an image side surface S18. The optical imaging lens has an imaging plane S19, and light from an object passes through the respective surfaces S1 to S18 in order and finally forms an image on the imaging plane S19.

In Embodiment 7, a value of a total effective focal length f of the optical imaging lens is 6.38 mm, a value of an on-axis distance TTL between the object side surface S1 of the first lens E1 to the image plane S19 is 7.49 mm, and a value of the maximum field of view FOV is 82.80.

Table 13 shows a table of basic parameters of the optical imaging lens of Embodiment 7, wherein the units of the radius of curvature, thickness/distance, and focal length are all millimeters (mm). Table 14 shows higher-order coefficients of each aspherical lens surface that are applicable in Embodiment 7, wherein the surface shape of each aspherical surface can be defined by formula (1) given in Embodiment 1 described above.

TABLE 13

| Surface No. | Surface type | Radius of curvature | Thickness/ distance | Material Refractive index | Abbe number | Focal length | Conic coefficient |
|---|---|---|---|---|---|---|---|
| OBJ | Spherical | Infinity | Infinity | | | | |
| STO | Spherical | Infinity | −0.6669 | | | | |
| S1 | Aspherical | 2.4727 | 0.8684 | 1.543 | 53.64 | 5.13 | 0.1433 |
| S2 | Aspherical | 18.8548 | 0.0817 | | | | 13.0453 |
| S3 | Aspherical | 6.3648 | 0.2506 | 1.673 | 19.56 | −10.36 | 2.0422 |
| S4 | Aspherical | 3.2887 | 0.2351 | | | | 0.2018 |
| S5 | Aspherical | 7.6184 | 0.3620 | 1.558 | 40.73 | 44.63 | 10.9864 |
| S6 | Aspherical | 10.7652 | 0.3771 | | | | 11.7863 |
| S7 | Aspherical | −40.2963 | 0.4301 | 1.590 | 32.41 | 50.60 | 0.0000 |
| S8 | Aspherical | −17.2750 | 0.3628 | | | | 96.7688 |
| S9 | Aspherical | 19.4901 | 0.2534 | 1.619 | 26.24 | −118.16 | −55.2170 |
| S10 | Aspherical | 15.3371 | 0.4641 | | | | −98.9988 |
| S11 | Aspherical | −11.2296 | 0.5071 | 1.573 | 38.23 | −15.22 | 3.0080 |
| S12 | Aspherical | 40.4123 | 0.2280 | | | | −99.0000 |
| S13 | Aspherical | 2.7758 | 0.8689 | 1.544 | 56.00 | 6.85 | −0.8834 |
| S14 | Aspherical | −6.5674 | 0.9967 | | | | 0.0000 |
| S15 | Aspherical | −7.1826 | 0.4442 | 1.548 | 52.66 | −4.97 | 0.2754 |
| S16 | Aspherical | −12.6606 | 0.1726 | | | | 0.0000 |
| S17 | Spherical | Infinity | 0.2163 | 1.517 | 64.17 | | |
| S18 | Spherical | Infinity | 0.3725 | | | | |
| S19 | Spherical | Infinity | | | | | |

TABLE 14

| Surface No. | A4 | A6 | A8 | A10 | A12 | A14 | A16 |
|---|---|---|---|---|---|---|---|
| S1 | −5.4808E−02 | −1.8424E−02 | −5.9586E−03 | −1.7925E−03 | −5.3651E−04 | −1.5765E−04 | −4.8013E−05 |
| S2 | −2.1426E−02 | 1.1856E−02 | −2.3573E−03 | 1.4457E−04 | −1.8349E−04 | 1.8901E−05 | −1.2126E−05 |
| S3 | −4.8663E−02 | 1.8120E−02 | −2.5771E−03 | 5.7567E−04 | −4.9667E−05 | 9.2043E−05 | 1.1575E−05 |
| S4 | −8.8585E−03 | 1.1718E−02 | −1.3517E−04 | −2.8564E−04 | −3.2455E−04 | −1.3328E−04 | −4.5775E−05 |
| S5 | 1.2174E−02 | 1.3699E−02 | 4.5976E−03 | 5.7492E−04 | −9.2587E−05 | −8.8578E−05 | −3.7675E−05 |
| S6 | −1.0893E−02 | 4.9112E−03 | 1.8377E−03 | 3.9012E−04 | 6.5514E−05 | 1.4725E−05 | 2.5787E−06 |
| S7 | −1.4875E−01 | −1.0404E−02 | −8.4672E−04 | −4.7936E−05 | −4.4805E−05 | −1.1952E−05 | 8.7265E−07 |
| S8 | −2.6295E−01 | −8.9381E−03 | 9.7114E−04 | 5.7358E−04 | 2.3964E−04 | 1.9059E−04 | 1.2608E−04 |
| S9 | −3.4540E−01 | −5.6520E−03 | −4.1513E−04 | −1.5485E−03 | −3.3432E−04 | −2.1408E−04 | 1.9696E−05 |
| S10 | −3.6936E−01 | 1.5035E−02 | 2.6582E−03 | −2.6422E−03 | 6.1849E−04 | −2.1129E−04 | 1.0469E−04 |
| S11 | −3.6371E−01 | −7.3493E−02 | 7.5362E−03 | 6.3518E−03 | 3.1826E−03 | 9.1440E−04 | 3.8542E−04 |
| S12 | −1.1460E+00 | 1.3972E−01 | −2.2711E−02 | 1.5145E−02 | −5.0291E−03 | 3.2368E−03 | 1.1448E−03 |
| S13 | −3.2655E+00 | 4.4550E−01 | −1.3751E−02 | −6.6770E−04 | −2.3355E−02 | 3.4923E−03 | 1.3174E−03 |
| S14 | 7.5865E−01 | 5.0464E−01 | 3.5562E−02 | −1.2164E−01 | 6.1138E−02 | −5.2315E−02 | 3.1486E−04 |
| S15 | −8.5978E−02 | 6.7829E−01 | −3.3647E−01 | 1.3221E−01 | −3.1332E−02 | −2.5654E−03 | 3.9097E−03 |
| S16 | 1.0372E+00 | 9.8922E−02 | 3.9394E−03 | 1.7392E−01 | 1.2575E−01 | 4.3243E−02 | −6.0973E−03 |

| Surface No. | A18 | A20 | A22 | A24 | A26 | A28 | A30 |
|---|---|---|---|---|---|---|---|
| S1 | −1.1559E−05 | −3.7153E−06 | 0.0000E+00 | 0.0000E+00 | 0.0000E+00 | 0.0000E+00 | 0.0000E+00 |
| S2 | 2.3502E−06 | −1.1138E−06 | 0.0000E+00 | 0.0000E+00 | 0.0000E+00 | 0.0000E+00 | 0.0000E+00 |
| S3 | 7.0005E−06 | 4.8583E−07 | 0.0000E+00 | 0.0000E+00 | 0.0000E+00 | 0.0000E+00 | 0.0000E+00 |
| S4 | −1.0987E−05 | −1.5099E−06 | 0.0000E+00 | 0.0000E+00 | 0.0000E+00 | 0.0000E+00 | 0.0000E+00 |
| S5 | −1.2204E−05 | −2.9526E−06 | 0.0000E+00 | 0.0000E+00 | 0.0000E+00 | 0.0000E+00 | 0.0000E+00 |
| S6 | 1.4938E−06 | −1.7445E−07 | 0.0000E+00 | 0.0000E+00 | 0.0000E+00 | 0.0000E+00 | 0.0000E+00 |
| S7 | 8.4098E−07 | 1.3593E−06 | 0.0000E+00 | 0.0000E+00 | 0.0000E+00 | 0.0000E+00 | 0.0000E+00 |
| S8 | 4.7530E−05 | 2.0476E−05 | 0.0000E+00 | 0.0000E+00 | 0.0000E+00 | 0.0000E+00 | 0.0000E+00 |
| S9 | −2.3514E−05 | −4.2540E−06 | 0.0000E+00 | 0.0000E+00 | 0.0000E+00 | 0.0000E+00 | 0.0000E+00 |
| S10 | −8.3295E−05 | 3.7310E−05 | 0.0000E+00 | 0.0000E+00 | 0.0000E+00 | 0.0000E+00 | 0.0000E+00 |
| S11 | −3.1138E−05 | −6.6035E−06 | 0.0000E+00 | 0.0000E+00 | 0.0000E+00 | 0.0000E+00 | 0.0000E+00 |
| S12 | 5.4957E−04 | 1.9661E−05 | 0.0000E+00 | 0.0000E+00 | 0.0000E+00 | 0.0000E+00 | 0.0000E+00 |
| S13 | 1.3835E−03 | −1.2673E−04 | 1.7130E−04 | −7.7471E−05 | 0.0000E+00 | 0.0000E+00 | 0.0000E+00 |
| S14 | 1.3320E−02 | −1.2147E−02 | 2.5810E−03 | 2.5522E−04 | −3.7675E−04 | −2.4322E−05 | −1.2515E−05 |
| S15 | 8.3605E−04 | −3.5417E−03 | 2.9675E−03 | −1.3732E−03 | 3.5188E−04 | −2.1716E−06 | −1.4417E−05 |
| S16 | 2.5619E−02 | −4.9994E−02 | 5.5977E−02 | −2.3639E−02 | 2.1926E−02 | −2.8780E−03 | 2.2063E−03 |

Figure 14A:
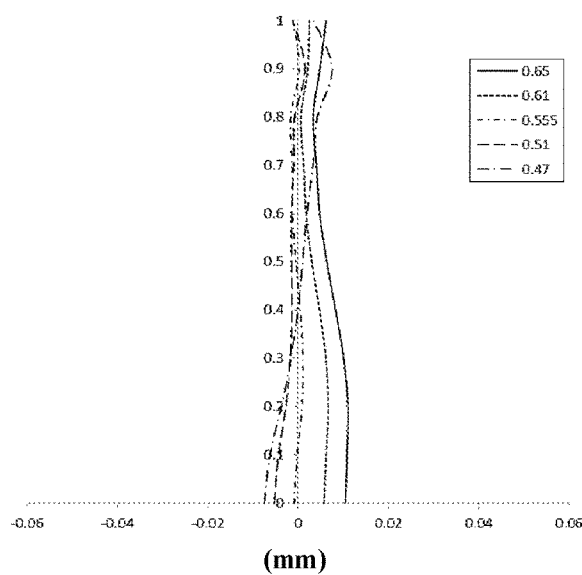
Figure 14B:
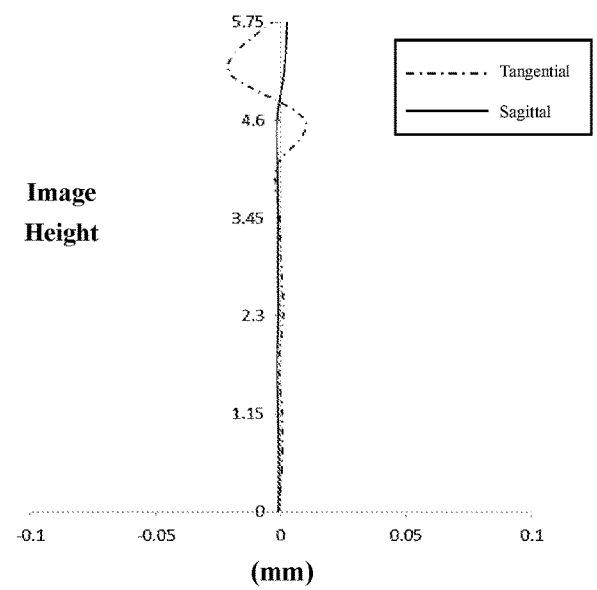

FIG. 14A shows a longitudinal aberration curve of the optical imaging lens according to Embodiment 7, which represents the deviation of the converged focal point after light of different wavelengths passes through the camera lens. FIG. 14B shows an astigmatism curve of the optical imaging lens according to Embodiment 7, which represents the curvature of the tangential image plane and the curvature of the sagittal image plane. FIG. 14C shows a distortion curve of the optical imaging lens according to Embodiment 7, which represents distortion magnitude values corresponding to different image heights. FIG. 14D shows a lateral color curve of the optical imaging lens according to Embodiment 7, which represents the deviation of different image heights on the imaging plane after light passes through the camera lens. According to FIGS. 14A to 14D, it can be seen that the optical imaging lens given in Embodiment 7 can achieve good imaging quality.

Embodiment 8

An optical imaging lens according to Embodiment 8 of the present application will be described below with reference to FIGS. 15 to 16D. FIG. 15 shows a schematic structural diagram of the optical imaging lens according to Embodiment 8 of the present application.

As shown in FIG. 15, the optical imaging lens includes a diaphragm STO, a first lens E1, a second lens E2, a third lens E3, a fourth lens E4, a fifth lens E5, a sixth lens E6, a seventh lens E7, an eighth lens E8 and a filter E9 in order from an object side to an image side along an optical axis.

The first lens E1 has a positive refractive power, and has a convex object side surface S1 and a concave image side surface S2. The second lens E2 has a negative refractive power, and has a convex object side surface S3 and a concave image side surface S4. The third lens E3 has a positive refractive power, and has a convex object side surface S5 and a concave image side surface S6. The fourth lens E4 has a positive refractive power, and has a concave object side surface S7 and a convex image side surface S8. The fifth lens E5 has a negative refractive power, and has a convex object side surface S9 and a concave image side surface S10. The sixth lens E6 has a positive refractive power, and has a concave object side surface S11 and a convex image side surface S12. The seventh lens E7 has a positive refractive power, and has a convex object side surface S13 and a convex image side surface S14. The eighth lens E8 has a negative refractive power, and has a concave object side surface S15 and a convex image side surface S16. The filter E9 has an object side surface S17 and an image side surface S18. The optical imaging lens has an imaging plane S19, and light from an object passes through the respective surfaces S1 to S18 in order and finally forms an image on the imaging plane S19.

In Embodiment 8, a value of a total effective focal length f of the optical imaging lens is 6.31 mm, a value of an on-axis distance TTL between the object side surface S1 of the first lens E1 to the image plane S19 is 7.52 mm, and a value of the maximum field of view FOV is 78.6°.

Table 15 shows a table of basic parameters of the optical imaging lens of Embodiment 8, wherein the units of the radius of curvature, thickness/distance, and focal length are all millimeters (mm). Table 16 shows higher-order coefficients of each aspherical lens surface that are applicable in Embodiment 8, wherein the surface shape of each aspherical surface can be defined by formula (1) given in Embodiment 1 described above.

TABLE 15

| Surface No. | Surface type | Radius of curvature | Thickness/ distance | Material Refractive index | Abbe number | Focal length | Conic coefficient |
|---|---|---|---|---|---|---|---|
| OBJ | Spherical | Infinity | Infinity | | | | |
| STO | Spherical | Infinity | −0.6474 | | | | |
| S1 | Aspherical | 2.4793 | 0.8334 | 1.542 | 55.90 | 5.47 | 0.1561 |
| S2 | Aspherical | 13.1728 | 0.0524 | | | | 3.9113 |
| S3 | Aspherical | 5.4748 | 0.2500 | 1.676 | 19.24 | −14.70 | 2.1379 |
| S4 | Aspherical | 3.4767 | 0.2714 | | | | 0.2376 |
| S5 | Aspherical | 9.5817 | 0.3696 | 1.550 | 45.56 | 50.03 | 10.8597 |
| S6 | Aspherical | 14.4724 | 0.3623 | | | | 13.7631 |
| S7 | Aspherical | −29.3891 | 0.3925 | 1.589 | 30.38 | 54.58 | 0.0000 |
| S8 | Aspherical | −4.2414 | 0.3339 | | | | 0.0000 |
| S9 | Aspherical | 20.7054 | 0.2704 | 1.674 | 19.39 | −22.09 | −35.5290 |
| S10 | Aspherical | 8.6623 | 0.4525 | | | | −98.9988 |
| S11 | Aspherical | −16.1641 | 0.5832 | 1.585 | 31.38 | 54.73 | 3.0080 |
| S12 | Aspherical | −10.9070 | 0.2265 | | | | −89.6432 |
| S13 | Aspherical | 3.8848 | 0.9013 | 1.547 | 53.09 | 12.16 | −0.9012 |
| S14 | Aspherical | −7.0833 | 0.9891 | | | | 0.0000 |
| S15 | Aspherical | −7.5572 | 0.5068 | 1.559 | 40.48 | −5.35 | 0.3040 |
| S16 | Aspherical | −12.5603 | 0.1528 | | | | 0.0000 |
| S17 | Spherical | Infinity | 0.2163 | 1.517 | 64.17 | | |
| S18 | Spherical | Infinity | 0.3527 | | | | |
| S19 | Spherical | Infinity | | | | | |

TABLE 16

| Surface No. | A4 | A6 | A8 | A10 | A12 | A14 | A16 |
|---|---|---|---|---|---|---|---|
| S1 | −4.8894E−02 | −2.0049E−02 | −7.6023E−03 | −2.4332E−03 | −8.0422E−04 | −2.4892E−04 | −9.1230E−05 |
| S2 | −1.9443E−02 | 1.4121E−03 | −2.6448E−03 | 3.7217E−04 | −3.9845E−04 | 1.0808E−04 | −6.7282E−05 |
| S3 | −4.5724E−02 | 1.9891E−02 | −2.2216E−03 | 1.3206E−04 | −7.2083E−04 | −1.7670E−05 | −2.0637E−04 |
| S4 | −8.5580E−03 | 1.0942E−02 | −2.5964E−04 | −5.1850E−04 | −4.8649E−04 | −9.0514E−05 | −4.7971E−05 |
| S5 | 1.5200E−02 | 1.3963E−02 | 3.6286E−03 | 2.3656E−04 | −1.7494E−04 | −8.0017E−05 | −2.1486E−05 |
| S6 | −1.2656E−02 | 5.3094E−03 | 1.7385E−03 | 2.5220E−04 | 4.8399E−05 | −9.8397E−06 | 8.4031E−06 |
| S7 | −1.5113E−01 | −1.2497E−02 | −4.1085E−04 | −1.7377E−04 | −6.4846E−05 | −2.1644E−05 | −1.5888E−05 |
| S8 | 2.6045E−01 | −6.5349E−03 | −6.7606E−03 | 2.3536E−03 | −1.6107E−03 | 9.1263E−04 | −5.1242E−04 |
| S9 | −3.4251E−01 | 7.1763E−04 | −1.6374E−03 | −8.7360E−04 | −1.2579E−04 | −1.6023E−04 | −7.8276E−06 |
| S10 | −4.1672E−01 | 1.9804E−02 | 3.2477E−03 | −1.5192E−03 | 3.1903E−04 | −6.0216E−04 | −4.4054E−05 |
| S11 | −4.9791E−01 | −8.3092E−02 | 8.8055E−03 | 5.2263E−03 | 5.0392E−03 | 1.4400E−03 | 2.5425E−04 |
| S12 | −1.0896E+00 | 1.0916E−01 | −2.5456E−03 | 9.3554E−03 | 8.4522E−04 | 9.3148E−04 | −6.4831E−05 |
| S13 | −3.3965E−01 | 4.1398E−01 | 1.4523E−01 | −3.7358E−02 | −2.6304E−02 | 7.6318E−03 | 1.0747E−02 |
| S14 | 5.9486E−01 | 4.6813E−01 | 6.7357E−02 | −6.8712E−02 | 6.1687E−03 | −2.7346E−02 | 1.1222E−02 |
| S15 | −1.3071E−01 | 6.7736E−01 | −3.4341E−01 | 1.2811E−01 | −3.2307E−02 | −2.3014E−03 | 4.0650E−03 |
| S16 | 9.9799E−01 | −1.4650E−01 | 3.7053E−01 | 2.1098E−02 | 1.3956E−01 | 9.8129E−02 | −9.6293E−02 |

| Surface No. | A18 | A20 | A22 | A24 | A26 | A28 | A30 |
|---|---|---|---|---|---|---|---|
| S1 | −2.9618E−05 | −1.7680E−05 | 0.0000E+00 | 0.0000E+00 | 0.0000E+00 | 0.0000E+00 | 0.0000E+00 |
| S2 | 3.7253E−06 | −9.6361E−06 | 0.0000E+00 | 0.0000E+00 | 0.0000E+00 | 0.0000E+00 | 0.0000E+00 |
| S3 | −3.3605E−05 | −2.3645E−05 | 0.0000E+00 | 0.0000E+00 | 0.0000E+00 | 0.0000E+00 | 0.0000E+00 |
| S4 | −3.1016E−06 | −5.2048E−07 | 0.0000E+00 | 0.0000E+00 | 0.0000E+00 | 0.0000E+00 | 0.0000E+00 |
| S5 | −2.4664E−05 | 9.7904E−06 | 0.0000E+00 | 0.0000E+00 | 0.0000E+00 | 0.0000E+00 | 0.0000E+00 |
| S6 | −2.0834E−06 | −9.2949E−07 | 0.0000E+00 | 0.0000E+00 | 0.0000E+00 | 0.0000E+00 | 0.0000E+00 |
| S7 | 1.4040E−06 | −6.5868E−06 | 0.0000E+00 | 0.0000E+00 | 0.0000E+00 | 0.0000E+00 | 0.0000E+00 |
| S8 | 2.1409E−04 | −5.7643E−05 | 2.8773E−05 | −7.2186E−06 | 0.0000E+00 | 0.0000E+00 | 0.0000E+00 |
| S9 | −2.5802E−05 | 9.0859E−07 | 0.0000E+00 | 0.0000E+00 | 0.0000E+00 | 0.0000E+00 | 0.0000E+00 |
| S10 | −1.1407E−04 | 3.5316E−05 | 0.0000E+00 | 0.0000E+00 | 0.0000E+00 | 0.0000E+00 | 0.0000E+00 |
| S11 | −3.5795E−04 | −1.8461E−04 | 0.0000E+00 | 0.0000E+00 | 0.0000E+00 | 0.0000E+00 | 0.0000E+00 |
| S12 | −7.7177E−04 | −1.0395E−04 | 0.0000E+00 | 0.0000E+00 | 0.0000E+00 | 0.0000E+00 | 0.0000E+00 |
| S13 | 2.7409E−03 | −1.3937E−03 | −1.4164E−03 | −4.9249E−04 | 0.0000E+00 | 0.0000E+00 | 0.0000E+00 |
| S14 | −6.0153E−03 | 2.1902E−03 | −3.6379E−03 | 4.5415E−03 | −3.0258E−03 | 2.0185E−03 | −5.3139E−04 |
| S15 | 1.3008E−03 | −3.2539E−03 | 2.2691E−03 | −1.2025E−03 | 3.9445E−04 | 1.7987E−04 | −1.5002E−04 |
| S16 | 5.4351E−02 | −4.1850E−02 | 3.0916E−02 | −4.2376E−03 | 1.0953E−02 | −6.0780E−03 | 4.2335E−03 |

Figure 16A:
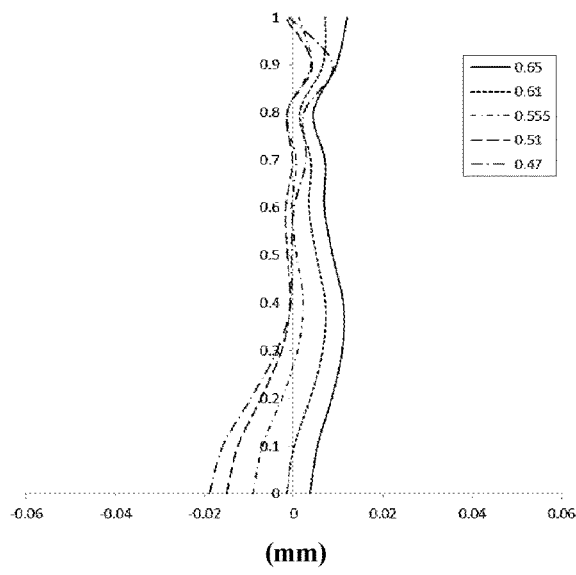
FIGS. 16A to 16D show a longitudinal aberration curve, astigmatism curve, distortion curve and lateral color curve of the optical imaging lens according to Embodiment 8, respectively.
Figure 16B:
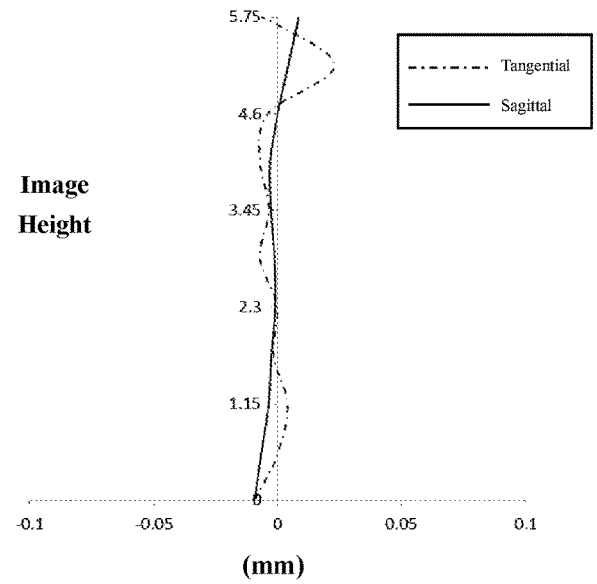
Figure 16C:
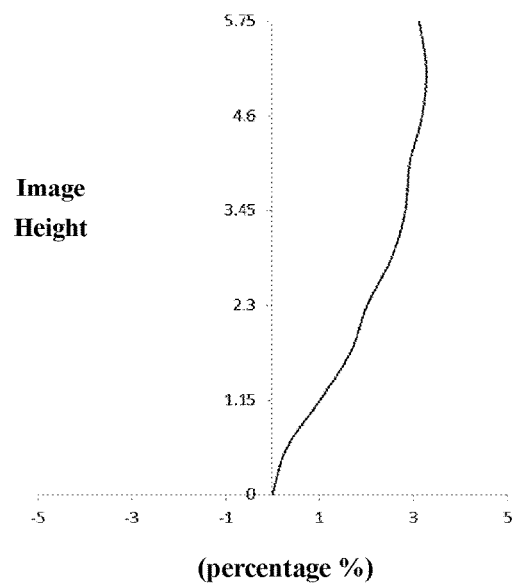
Figure 16D:
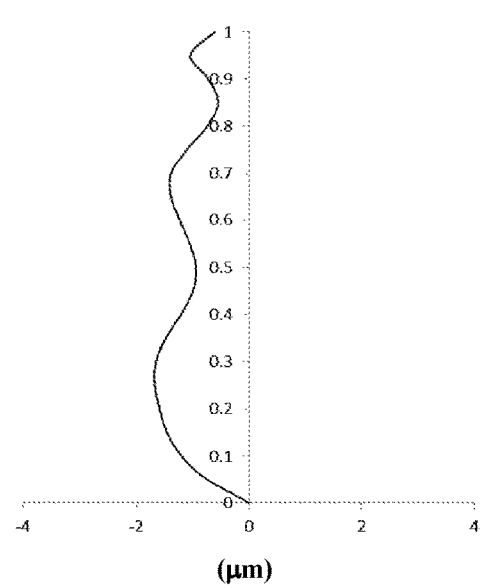

FIG. 16A shows a longitudinal aberration curve of the optical imaging lens according to Embodiment 8, which represents the deviation of the converged focal point after light of different wavelengths passes through the camera lens. FIG. 16B shows an astigmatism curve of the optical imaging lens according to Embodiment 8, which represents the curvature of the tangential image plane and the curvature of the sagittal image plane. FIG. 16C shows a distortion curve of the optical imaging lens according to Embodiment 8, which represents distortion magnitude values corresponding to different image heights. FIG. 16D shows a lateral color curve of the optical imaging lens according to Embodiment 8, which represents the deviation of different image heights on the imaging plane after light passes through the camera lens. According to FIGS. 16A to 16D, it can be seen that the optical imaging lens given in Embodiment 8 can achieve good imaging quality.

In summary, Embodiments 1 to 8 satisfy the relationships shown in Table 17, respectively.

TABLE 17

| Conditional expression | Embodiment | | | | | | | |
|---|---|---|---|---|---|---|---|---|
|  | 1 | 2 | 3 | 4 | 5 | 6 | 7 | 8 |
| f × tan(Semi-FOV) (mm) | 5.19 | 4.67 | 5.20 | 5.22 | 5.20 | 5.62 | 5.62 | 5.17 |
| (R13 + R15)/T78 | −6.01 | −5.60 | −5.42 | −5.40 | −5.53 | −4.40 | −4.42 | −3.71 |
| f3/f12 | 2.17 | 2.76 | 2.47 | 2.55 | 2.55 | 5.34 | 4.47 | 5.78 |
| f/f7 | 0.94 | 0.99 | 0.89 | 0.87 | 0.84 | 0.92 | 0.93 | 0.52 |
| f/f8 | −1.26 | −1.20 | −1.28 | −1.29 | −1.28 | −1.29 | −1.28 | −1.18 |
| \|f2\|/(R3 − R4) | 6.20 | 7.67 | 5.60 | 5.21 | 4.50 | 3.50 | 3.37 | 7.36 |
| f1/R1 | 2.28 | 2.28 | 2.22 | 2.19 | 2.16 | 2.07 | 2.07 | 2.20 |
| f3/R6 | 1.05 | 2.29 | 1.30 | 1.37 | 1.52 | 4.93 | 4.15 | 3.46 |
| f/R11 | −0.60 | −0.22 | −0.61 | −0.74 | −0.64 | −0.67 | −0.57 | −0.39 |
| R7/R5 | −2.32 | −2.21 | −2.24 | −2.15 | −2.53 | −5.49 | −5.29 | −3.07 |
| R11/R7 | 0.67 | 1.94 | 0.66 | 0.57 | 0.55 | 0.22 | 0.28 | 0.55 |
| CT2/T23 | 1.47 | 1.14 | 1.39 | 1.37 | 1.43 | 1.06 | 1.07 | 0.92 |
| (CT6 + CT7 + CT8)/3 | 0.57 | 0.56 | 0.60 | 0.63 | 0.61 | 0.59 | 0.61 | 0.66 |
| (CT3 + CT4 + CT5)/T56 | 3.09 | 2.18 | 2.66 | 2.62 | 2.68 | 2.23 | 2.25 | 2.28 |
| \|V4 − V6\| | 2.43 | 10.50 | 13.83 | 2.43 | 0.00 | 10.25 | 5.82 | 1.00 |
| V5 | 23.49 | 20.56 | 23.49 | 23.49 | 23.49 | 25.52 | 26.24 | 19.39 |
| ΣCT/ΣAT | 1.93 | 1.64 | 1.82 | 1.86 | 1.86 | 1.43 | 1.45 | 1.53 |
| TTL/ImgH | 1.41 | 1.64 | 1.42 | 1.43 | 1.41 | 1.29 | 1.30 | 1.31 |

The present application further provides an imaging device, which is provided with an electronic photosensitive element to image. The electronic photosensitive element may be a Charge-Coupled Device (CCD) or a Complementary Metal Oxide Semiconductor element (CMOS). The imaging device may be an independent imaging device such as a digital camera, or may be an imaging module integrated in a mobile electronic device such as a mobile phone. The imaging device is equipped with the optical imaging lens described above.

The above description is only the preferred embodiments of the present application and the explanation of the applied technical principle. It should be understood by those skilled in the art that the scope of protection involved in the present application is not limited to technical solutions formed by specific combinations of the above technical features, and at the same time, should also cover other technical solutions formed by any combination of the above technical features or equivalent features thereof without departing from the concept of the present application. For example, the above features and (but not limited to) the technical features with similar functions disclosed in the present application are replaced with each other to form technical solutions.

What is claimed is:

1. An optical imaging lens, comprising, in order from an object side to an image side along an optical axis: a first lens, a second lens, a third lens, a fourth lens, a fifth lens, a sixth lens, a seventh lens and an eighth lens;
   wherein the first lens has a positive refractive power, the second lens has a negative refractive power, the third lens has a positive refractive power, the seventh lens has a positive refractive power, and the eighth lens has a negative refractive power;
   a radius of curvature R13 of an object side surface of the seventh lens, a radius of curvature R15 of an object side surface of the eighth lens, and a separation distance T78 between the seventh lens and the eighth lens on the optical axis satisfy −7.0<(R13+R15)/T78<−3.0; and
   a combined focal length f12 of the first lens and the second lens and an effective focal length f3 of the third lens satisfy 2.0<f3/f12<6.0;
   wherein the maximum semi-field of view Semi-FOV of the optical imaging lens and a total effective focal length f of the optical imaging lens satisfy 4.5 mm<f× tan(Semi-FOV)<6.0 mm.

2. The optical imaging lens according to claim 1, wherein the radius of curvature R13 of the object side surface of the seventh lens, the radius of curvature R15 of the object side surface of the eighth lens, and the separation distance T78 between the seventh lens and the eighth lens on the optical axis satisfy −6.5<(R13+R15)/T78<−3.5.

3. The optical imaging lens according to claim 1, wherein the total effective focal length f of the optical imaging lens and an effective focal length f7 of the seventh lens satisfy 0.5≤f/f7≤1.0.

4. The optical imaging lens according to claim 1, wherein the total effective focal length f of the optical imaging lens and an effective focal length f8 of the eighth lens satisfy −1.5<f/f8<−1.0.

5. An optical imaging lens, comprising, in order from an object side to an image side along an optical axis: a first lens, a second lens, a third lens, a fourth lens, a fifth lens, a sixth lens, a seventh lens and an eighth lens;
   wherein the first lens has a positive refractive power, the second lens has a negative refractive power, the third lens has a positive refractive power, the seventh lens has a positive refractive power, and the eighth lens has a negative refractive power;

wherein the maximum semi-field of view Semi-FOV of the optical imaging lens and a total effective focal length f of the optical imaging lens satisfy f×tan(Semi-FOV)>4.5 mm;

a radius of curvature R13 of an object side surface of the seventh lens, a radius of curvature R15 of an object side surface of the eighth lens, and a separation distance T78 between the seventh lens and the eighth lens on the optical axis satisfy −6.5<(R13+R15)/T78<−3.5; and a combined focal length f12 of the first lens and the second lens and an effective focal length f3 of the third lens satisfy 2.0<f3/f12<6.0;

wherein an effective focal length f2 of the second lens, a radius of curvature R3 of an object side surface of the second lens, and a radius of curvature R4 of an image side surface of the second lens satisfy 3.0<|f2|/(R3−R4)<8.0.

6. The optical imaging lens according to claim 1, wherein an effective focal length f1 of the first lens and a radius of curvature R1 of an object side surface of the first lens satisfy 2.0<f1/R1<2.5.

7. The optical imaging lens according to claim 1, wherein an effective focal length f3 of the third lens and a radius of curvature R6 of an image side surface of the third lens satisfy 1.0≤f3/R6≤5.0.

8. The optical imaging lens according to claim 1, wherein the total effective focal length f of the optical imaging lens and a radius of curvature R11 of an object side surface of the sixth lens satisfy −1.0<f/R11<0.

9. The optical imaging lens according to claim 1, wherein a radius of curvature R7 of an object side surface of the fourth lens and a radius of curvature R5 of an object side surface of the third lens satisfy −6.0<R7/R5<−2.0.

10. The optical imaging lens according to claim 1, wherein an object side surface of the fourth lens is concave; and a radius of curvature R7 of an object side surface of the fourth lens and a radius of curvature R11 of an object side surface of the sixth lens satisfy 0<R11/R7<2.0.

11. The optical imaging lens according to claim 1, wherein a center thickness CT2 of the second lens and a separation distance T23 between the second lens and the third lens on the optical axis satisfy 0.9≤CT2/T23≤1.5.

12. The optical imaging lens according to claim 1, wherein a center thickness CT6 of the sixth lens on the optical axis, a center thickness CT7 of the seventh lens on the optical axis, and a center thickness CT8 of the eighth lens on the optical axis satisfy 0.5 mm<(CT6+CT7+CT8)/3<0.7 mm.

13. The optical imaging lens according to claim 1, wherein a center thickness CT3 of the third lens on the optical axis, a center thickness CT4 of the fourth lens on the optical axis, a central thickness CT5 of the fifth lens on the optical axis and a separation distance T56 between the fifth lens and the sixth lens on the optical axis satisfy 2.0<(CT3+CT4+CT5)/T56<3.5.

14. The optical imaging lens according to claim 1, wherein an Abbe number V4 of the fourth lens and an Abbe number V6 of the sixth lens satisfy |V4−V6|<15.

15. The optical imaging lens according to claim 1, wherein an Abbe number of the fifth lens V5 satisfies 15<V5<30.

16. The optical imaging lens according to claim 1, wherein a sum ΣCT of center thicknesses of respective lenses of the first lens to the eighth lens on the optical axis, and a sum ΣAT of separation distances between any two adjacent lenses of the first lens to the eighth lens on the optical axis satisfy 1.4≤ΣCT/ΣAT≤2.0.

17. The optical imaging lens according to claim 1, wherein a distance TTL from an object side surface of the first lens to an imaging plane of the optical imaging lens on the optical axis and a half ImgH of a diagonal length of an effective pixel region on the imaging plane of the optical imaging lens satisfy TTL/ImgH<1.5.

18. The optical imaging lens according to claim 1, wherein an effective focal length f2 of the second lens, a radius of curvature R3 of an object side surface of the second lens, and a radius of curvature R4 of an image side surface of the second lens satisfy 3.0<|f2|/(R3−R4)<8.0.

* * * * *